United States Patent [19]

Trytko

[11] Patent Number: 5,231,499
[45] Date of Patent: Jul. 27, 1993

[54] KEYED, TRUE-TRANSPARENCY IMAGE INFORMATION COMBINE

[75] Inventor: David E. Trytko, Foster City, Calif.

[73] Assignee: Ampex Systems Corporation, Redwood City, Calif.

[21] Appl. No.: 654,127

[22] Filed: Feb. 11, 1991

[51] Int. Cl.[5] ............... H04N 5/265; H04N 5/262
[52] U.S. Cl. ............................. 358/183; 358/22; 358/182
[58] Field of Search .............. 358/183, 22, 182; 340/729, 182; 364/522

[56] References Cited

U.S. PATENT DOCUMENTS

| | | | |
|---|---|---|---|
| 2,994,966 | 8/1961 | Senitsky et al. | 364/521 |
| 3,585,628 | 6/1971 | Harrison | 340/324.8 |
| 3,598,908 | 8/1971 | Poulett | 178/6 |
| 3,673,324 | 6/1972 | Ito et al. | 178/6.8 |
| 3,790,704 | 2/1974 | Collomosse et al. | 178/6.8 |
| 3,959,582 | 5/1976 | Law et al. | 178/6.8 |
| 3,961,133 | 6/1976 | Bennett | 358/104 |

(List continued on next page.)

OTHER PUBLICATIONS

IBM Technical Disclosure Bulletin, vol. 25, No. 11B Apr. 1983 "High Speeds For Generating Or Updating Graphics With Splines On A Screen", Wahl et al., pp. 5880–5882 (USA).

Electronics, Nov. 20, 1980, "Video Display Processor Simulates Three Dimensions", Guttag et al., pp. 123–125 (USA).

Computer Graphics, vol. 18, No. 3, Jul. 1984, "The A-buffer, an Antialiased Hidden Surface Method", L. Carpenter, pp. 103–108 (USA).

Primary Examiner—James J. Groody
Assistant Examiner—Glenton B. Burgess
Attorney, Agent, or Firm—Richard J. Roddy

[57] ABSTRACT

A keyed, true-transparency combine and keyer receive a plurality of image information signals $V_i$, each having a corresponding input key signal $Bk_i$, over a respective channel. The image signals are dynamically ranked in a prioritized order, even on a field-by-field basis. However, rather than switch the individual image signals as the prioritized order changes, the order of the channels is dynamically and switchably interchanged within a keyer by switchably interchanging a plurality of substantially identical keyer units while generating a plurality of processed true transparency image key signals $Pk_i$. While there may be some structural distinctions among the keyer units, there is commonalty of function among the keyer units within the keyer. The keyer also generates processed background key signals $Pk_B$. The keyer units are switchably changed to produce true transparency processed key signals such that processed key signal $Pk_i$ for an i-th channel is produced by the i-th respective one of the substantially identical keyer units. The i-th keyer unit can modify the value of its input key signal $Bk_i$ with the values of the input key signals $Bk_j$ in the higher priority channels to generate a true transparency processed key signal $Pk_i$ for the i-th priority channel so that:

$$Pk_i = Bk_i \prod_{j=1}^{i} (1 - Bk_{j-1})$$

where $Bk_0=0$ and $Pk_1+Pk_2+ \ldots +Pk_N+Pk_B=1.0$. The combiner also cuts each respective image signal $V_i$ and background signal $V_B$ by its respective processed key signal and combines the plurality of cut signals to generate the special video effect of an image information combine $V_C$ so that:

$$V_C = Pk_1 V_1 + Pk_2 V_2 + \ldots + Pk_N V_N + Pk_B V_B.$$

36 Claims, 5 Drawing Sheets

U.S. PATENT DOCUMENTS

| | | | |
|---|---|---|---|
| 4,106,218 | 8/1978 | Polstorff | 364/521 |
| 4,207,596 | 6/1980 | Pires | 340/741 |
| 4,209,832 | 6/1980 | Gilham et al. | 364/521 |
| 4,317,114 | 2/1982 | Walker | 340/741 |
| 4,360,831 | 11/1982 | Kellar | 358/182 |
| 4,420,770 | 12/1983 | Rahman . | |
| 4,509,043 | 4/1985 | Mossaides | 340/721 |
| 4,528,636 | 7/1985 | Robinson | 364/521 |
| 4,555,775 | 11/1985 | Pike | 364/900 |
| 4,586,038 | 4/1986 | Sims et al. | 340/729 |
| 4,602,286 | 7/1986 | Kellar et al. | 358/183 |
| 4,675,666 | 6/1987 | Peterson | 340/721 |
| 4,675,725 | 7/1987 | Parkyn | 358/22 |
| 4,679,040 | 7/1987 | Yan | 340/747 |
| 4,682,217 | 7/1987 | David et al. | 358/89 |
| 4,684,990 | 8/1987 | Oxley | 358/183 |
| 4,758,892 | 7/1988 | Bloomfield | 358/183 |
| 4,774,583 | 9/1988 | Kellar et al. | 358/183 |
| 4,851,912 | 7/1989 | Jackson et al. | 358/183 |
| 4,853,784 | 8/1989 | Abt et al. | 358/183 |
| 4,970,595 | 11/1990 | Bloomfield | 358/22 |
| 5,010,407 | 4/1991 | Trytko | 358/183 |
| 5,016,105 | 5/1991 | Muller et al. | 358/183 |
| 5,027,213 | 6/1991 | Kamin | 358/183 |

KEYED, TRUE-TRANSPARENCY IMAGE INFORMATION COMBINE

This patent application is related to an application by Richard Dale Freeman, entitled the same as this application and filed concurrently with this application on Feb. 11, 1991 as U.S. Ser. No. 07/654,540.

BACKGROUND OF THE INVENTION

1. Field of the Invention

This invention relates to special effects and, more particularly, to the special effects obtainable by combining a plurality of image information signals into a keyed, true-transparency image information signal combine.

2. Description of Related Art

Various arrangements exist in the art for selectively changing, combining or manipulating one or more image information signals such as video image signals to achieve special effects such as might be viewed in a television system.

For example, U.S. Pat. No. 3,598,908, which is entitled "Digitally Controlled Lap Dissolver" and which issued Aug. 10, 1971, discloses a dissolver network for combining two video signals into a composite video signal. The dissolver network includes an attenuator network that incrementally changes the signal level of a first video input signal $V_1$ from a first level limit and concurrently changes the signal level of a second video input signal $V_2$ from a second level limit. The attenuator network operates at a clock rate corresponding to the video field rate, for example, at a rate of one times, or even at a sub-multiple of, the vertical synchronization rate. That scheme provides a uniform dissolve operation wherein the image information in the first video signal $V_1$ is eventually replaced by the image information in the second video signal $V_2$, and vice-versa. However, during the process of replacing the first signal with the second signal, the first and the second video signals are proportionately combined to form a composite video signal $V_C$, which has the property that the summation of the varying proportions $k_1$ and $k_2$, respectively, for the first and the second video signals $V_1$ and $V_2$, respectively, remains at one hundred percent over the dissolve time interval. The foregoing words can be restated using standard mathematical notation as:

$$V_C = k_1 V_1 + k_2 V_2 \quad (1)$$

where $k_1 + k_2 = 1.0$, which can be rewritten as:

$$V_C = k_1 V_1 + (1 - k_1) V_2.$$

The visual result from the mixing algorithm of equation (1) convincingly displays the first and the second video signals $V_1$ and $V_2$ as video images that may be transparent. That is to say, as $V_1$ dissolves into $V_2$, the visual result to the viewer appears as though an originally opaque $V_1$ becomes gradually more transparent, revealing $V_2$ as though $V_2$ were behind $V_1$.

Known switcher technology makes use of this mixing algorithm in a cascaded form in order to create a special video effect called a combine. A "combine" is a special effect obtainable by combining image information signals from two or more channels, for example, by combining N channels of video signals $V_i$ together with a generated background video signal $V_B$ in such a way as to make the scenes or images corresponding to the video signals appear to the viewer to be spatially related to each other in some manner and in accordance with some defined priority. Thereby, a combiner may create the special effect of a first video image from a first channel of higher priority being in front of a second video image from a second channel of lower priority in the sense that the first video image is seen to be closer to the viewer than is the second video image. Hence, a rank ordering, also called a prioritized ordering, can be defined among a plurality of video images such that, for example, a first video image from a first channel is seen to be in front of a second video image from a second channel, which, in turn, is seen to be in front of a third video image from a third channel, etc.

This special effect is created by cascading two or more mix/effect (M/E) units contained within the switcher, each of which is capable of embodying the mixing algorithm of equation (1). In so doing, the name "true transparency" algorithm is given to the mixing algorithm. For example, assume that it is desired to mix a first video signal $V_1$ over a second video signal $V_2$ over a third video signal $V_3$ over a background signal $V_B$. This can be implemented, for example, by using a key signal $k_3$ to mix the third video signal $V_3$ over the background signal $V_B$ to obtain a first mixed effect $M/E_1$ of:

$$M/E_1 = V_3 k_3 + V_B(1 - k_3).$$

In turn, by using a key signal $k_2$ to mix the second video signal $V_2$ over the first mixed effect $M/E_1$, one obtains a second mixed effect $M/E_2$ of:

$$\begin{aligned} M/E_2 &= V_2 k_2 + M/E_1(1 - k_2) \\ &= V_2 k_2 + V_3 k_3 (1 - k_2) + V_B(1 - k_3)(1 - k_2). \end{aligned}$$

Still further in turn, by using a key signal $k_1$ to mix the first video signal $V_1$ over the second mixed effect $M/E_2$, one obtains a third mixed effect $M/E_3$ of:

$$\begin{aligned} M/E_3 &= V_1 k_1 + M/E_2(1 - k_1) \\ &= V_1 k_1 + V_2 K_2 (1 - k_1) + \\ &\quad V_3 k_3 (1 - K_2)(1 - k_1) + \\ &\quad V_B(1 - k_3)(1 - k_2)(1 - k_1). \end{aligned}$$

The true transparency algorithm is further described in the article by Loren Carpenter, "The A-buffer, an Antialiased Hidden Surface Method," *Computer Graphics*, Vol. 18, No. 3 (July 1984), pp. 103-108.

By using the foregoing methodology of cascading the true transparency algorithm, each video image can be defined to be transparent by its corresponding key signal, and a convincing display of multiple transparent video images is still obtained. Notice, however, that in order to change the priority of the video images, the video images themselves are switched among the various M/E units. This architecture can thus become cumbersome when processing digital video signals, making it desirable to consider an alternative architecture.

As an example, U.S. Pat. No. 4,758,892, which is entitled "System for Producing a Video Combine from Multiple Video Images" and which issued Jul. 19, 1988 and which is incorporated herein by reference, discloses an alternative architecture for creating a combine. That alternative system generates a display of prioritized video images, but it does so without switching the video signals themselves. Rather, the video processing path for each video signal is dedicated as is a corresponding key processing path for each respective key signal. Instead of switching cumbersome video signals, the prior art alternative accomplishes similar results by switching only "key-taken" signals. The channel signals to be combined are synchronized so that digitally encoded video image signals, which define the respective video images in the respective channels, arrive at processing logic situated in the combiner during the same clock cycle for processing. Thereby, the video images are combined while being processed by the combiner to form the combined video signal $V_C$. The combining process involves taking a respective preselected portion $k_i$ of the value of each respective digitally encoded video image signal $V_i$ and adding the products thereby formed in such a manner that the total of the respective portions including any background portion $k_B$, as a percentage, is equal to one hundred percent. The foregoing words can be restated using standard mathematical notation as:

$$V_C = k_1 V_1 + k_2 V_2 + \ldots + k_N V_N + k_B V_B \quad (2)$$

where $k_1 + k_2 + \ldots + k_N + k_B = 1.0$ and where N is the number of video channels, whose signals $V_i$ are combined in respective portions $k_i$, and where $k_B$ is the portion of any background video signal $V_B$ that is included in the combine.

As an aside, it can be mentioned that the combiner process of taking a selected portion, or percentage, of the value of a typical digitally encoded image information signal can be accomplished by multiplying the value of the selected portion and the value of the image signal. That process is called "cutting" in the art and, in that manner, a video signal is said to be "cut".

It should be noted, however, that the particular mix algorithm described in the prior art patent does not result in the display of video images, which are convincingly transparent. One remaining problem is that lower priority video images such as those that are more distant from a viewer, when viewed through one or more transparent higher priority video images such as those that are closer to the viewer, may dominate the combined video signal in the sense that there is created an undesirable effect, which is manifested, in part, by the perception that some of the more distant lower priority video images appear to be closer to the viewer and to unnaturally dominate the combine than do some of the closer higher priority images.

Therefore, while the combiner architecture is preferable to that of conventional switcher technology when processing digital video signals, the mix algorithm embodied in the combiner yields undesirable results.

SUMMARY OF THE INVENTION

These and other problems are solved in accordance with the principles of my invention and, accordingly, a more desirable system for processing digital video combines would be one which produces the visual results obtained with the mix algorithm of the conventional switcher technology within the architecture of a video combiner. An object of the present invention is to provide such a system, apparatus and method that include a combiner and an improved keyer means, the keyer means having a plurality of substantially identical and switchably interchangeable keyer units, to generate a keyed, true-transparency image information special effect combine. The system, method and apparatus are adapted to receive a plurality of N input key signals $Bk_i$ and a corresponding plurality N of image information signals $V_i$. The signals may be provided over a corresponding plurality of N channels. The image signals can be dynamically ranked in a defined prioritized order, even on a field-by-field basis. However, rather than switch the individual image signals as their prioritized order changes, the order of the keyer units of the keyer means is dynamically and switchably interchanged. The combiner also uses the dynamically of substantially identical keyer units (in the sense that while there may be some structural distinctions among the keyer units there is a commonality of function among the keyer units) within the keyer means to generate a respective plurality of N processed true transparency image key signals $Pk_i$ for the corresponding plurality of N image signals $V_i$. The combiner cuts each respective image signal $V_i$ by its respective true transparency processed image key signal $Pk_i$, and combines the plurality of cut image signals and a background signal $V_B$, which itself can be cut by a processed background key signal $Pk_B$, to generate a special effect image information combine $V_C$. The keyer means produces the respective processed key signals such that the processed key signal $Pk_i$ for an i-th channel is produced by the i-th respective one of the plurality of substantially identical keyer units within the keyer means. The i-th keyer unit is adapted to modify the value of its input key signal $Bk_i$ with the values of the input key signals $Bk_j$ in the higher priority channels to generate a processed key signal $Pk_i$ for the i-th priority channel. The i-th keyer unit generates its produced true transparency processed image key signal $Pk_i$ for use in cutting the i-th image signal $V_i$ so that:

$$Pk_i = Bk_i \prod_{j=1}^{i} (1 - Bk_{j-1})$$

where $B_0 = 0$ while a background keyer unit generates the produced processed background key signal $Pk_B$ for use in cutting the background signal $V_B$ so that:

$$Pk_B = \prod_{j=1}^{N} (1 - Bk_j)$$

and so that $Pk_1 + Pk_2 + \ldots + Pk_N + Pk_B = 1.0$ while the combiner generates an image combine $V_C$ so that $V_C = Pk_1 V_1 + Pk_2 V_2 + \ldots + Pk_N V_N + Pk_B V_B$.

In one illustrative embodiment, responsive to a respective input key signal $Bk_i$, a key-requested signal may be generated. A key-taken signal for the respective image signal may be generated by multiplying the key-requested signal by a key-available signal. Responsive to the key-taken signal, the respective processed image key signal $Pk_i$ may be produced for the i-th channel. A key-now-available signal may be generated by multiplying the key-available signal by another key signal, which is equal to one minus the key-requested signal. The key-now-available signal may be extended from a higher priority channel keyer unit like the i-th keyer unit to a lower priority channel keyer unit like the (i+1)-st keyer unit for use as the key-available signal by the lower priority channel in generating its key-taken signal or for use by the background keyer unit in generating a processed background key signal $Pk_B$.

BRIEF DESCRIPTION OF THE DRAWING

These and other advantages of the present invention will become apparent from the following detailed description when taken in conjunction with the accompanying drawing in which.

DETAILED DESCRIPTION

The aforesaid U.S. Pat. No. 4,758,892, which is entitled "System for Producing a Video Combine from Multiple Video Images" and which issued Jul. 19, 1988 and which is incorporated herein by reference, teaches a combine of a generated background signal $V_B$ and a plurality of image information signals such as a plurality of video image signals $V_1, V_2, \ldots, V_N$ where N represents the number of image information signal channels.

Figure 6:
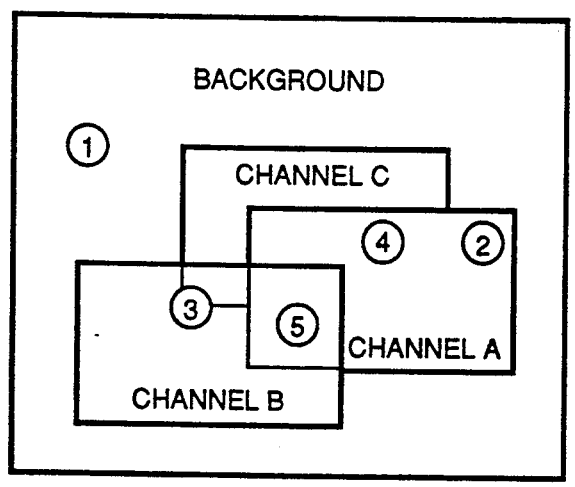
FIG. 6 is a pictorial representation of a combine employing four image information signals, which includes three video images as well as a video background and which is useful in describing my departure from the prior art and which is useful in describing the principles of my invention.

To get a mental picture of what a combine is and to help visualize what a combine looks like, refer to FIG. 6 where there is illustrated a combine of (N=) three image information signals $V_i$ and a background signal $V_B$. In that combine, assume that channel B has the highest priority (i.e., i=1), followed by channel A with the next highest priority (i.e., i=2), followed by channel C (i.e., i=3) and all trailed by a background signal channel, which is the channel with the lowest priority.

Figure 1:
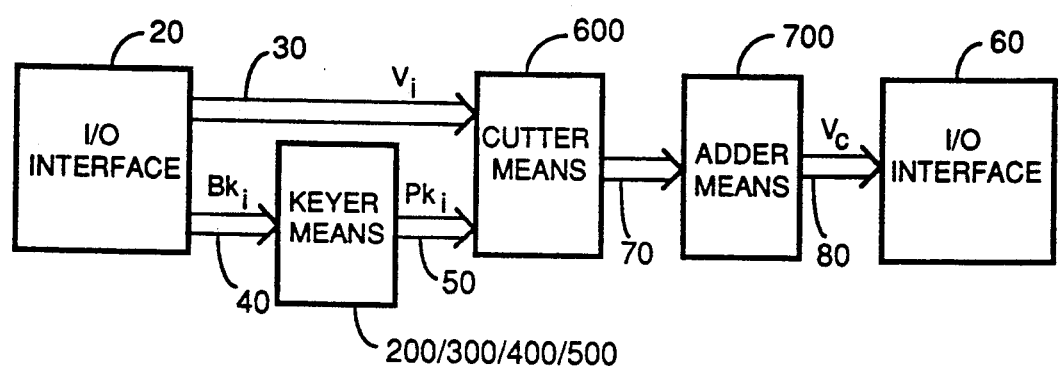
FIG. 1 is a block diagram illustration of an overall combiner system into which an improved keyer means using the principles of my invention may be embodied.

The priority of each channel in a combine can be embodied in a keyer means of a combiner to produce processed key signals in response to input key signals, for example, in a keyer means 200/300/400/500 like that shown in FIG. 1.

There are many kinds of input keys, which could be employed with embodiments of the principles of my invention. For example, one kind of input key could be a boundary key. Boundary key data, as the term is usually employed in the switcher art, refers to data for defining the presence or absence of image information such as would be found, for example, in a video signal. That is, input boundary key data define the boundary or border or edges enclosing or embracing an image to be displayed, for example, as a part of a larger video image. Yet another kind of key could be a chroma key. Further, key signals can assume various values. For example, a bi-state key signal can have a value of either zero or one while a linear key signal may have any of several values between zero and one. Accordingly, it should be understood that an embodiment of the principles of my invention can employ a variety of input keys.

As to producing processed keys, input key data may be supplied to a combiner. The input key data can be processed in the combiner to provide corresponding processed image key signals. Processed image key signals $Pk_i$ differ from the input key signals $Bk_i$ in that the processed image key signals define the portion, or percentage, by which the image information signals from the respective channels are to be cut. In addition, on the one hand, the input key signals ($Bk_1, Bk_2, Bk_3, \ldots, Bk_N$), which may not sum to unity as in equation (2) above, have the properties that:

$0 \leq Bk_i \leq 1$, and $$0 \leq Bk_1 + Bk_2 + \ldots + Bk_N \leq N \qquad (3)$$

and hence the summation of $Bk_i$ over the $i=1, \ldots, N$ channels may not equal unity. On the other hand, the processed key signals ($Pk_1, Pk_2, Pk_3, \ldots, Pk_N, Pk_B$), which do sum to unity as in equation (2) above, have the properties that:

$0 \leq Pk_i \leq 1$, and $0 \leq Pk_B \leq 1$, and $$Pk_1 + Pk_2 + \ldots + Pk_N + Pk_B = 1.0. \qquad (4)$$

When keys are processed by the keyer means, a key for a given channel can be modified by data from any channel having a higher priority. To illustrate refer again to the combine example of FIG. 6. On the one hand, since channel B is assumed to have the highest priority, the key signal for channel B is unaffected by data from either channel A or channel C. On the other hand, since channel C has a lower priority than do channels A and B, the key signal for channel C may be affected by data from either channel A or channel B or both channels A and B while the key signal for channel A may be affected by data from channel B, but not by data from channel C.

The image signal of a channel may be cut in the course of generating a combine. The amount by which an image signal is cut at any point in an image depends on several factors. Two examples of factors affecting cutting are now described.

As a first example, the amount by which an image signal is cut depends on the processed image key signal associated with the corresponding spatial location of the point in the image to be displayed. To illustrate this, each of points 1 through 5 in FIG. 6 represents a displayed spatial location in an image combine. In particular, point 1 is located in the background, which is assumed to be of the lowest priority. In the background and inasmuch as none of the geometry of images from channels A, B, or C embraces point 1, the keys for each of channels A, B and C would, as expected, be 0%, which means that none of the images from channels A, B or C appear at that point 1. At point 2, on the other hand, since the key for channel A is 100%, then 100% of channel A appears and, since the key for channels B and C are each 0%, then zero of those channels appears.

As a second example, the rank ordered position of a channel in the prioritized order among channels, for example, in the front-to-back order of channels having images being displayed on a television monitor, also affects how an image signal is cut at a spatial location. To illustrate this, at point 3 in FIG. 6, assume that images from channel B are to be viewed as being in front of images from channel C. Therefore, either, as is not shown in FIG. 6, if no transparency is desired, channel B could block out any part of the channel C image that is behind the channel B image, which would mean that the key for channel B would be 100% while the key for channel C would be 0%, or, as is shown in FIG. 6, if channel B is transparent and if channel C is not transparent, some portion, say 87.5%, of channel B could be expected to appear while some other portion, say 12.5%, of channel C could be expected to appear whereas 0% of channel A and 0% of the background would be expected to appear. (Note that none of channel A is displayed at point 3 because the geometric boundaries of the image from channel A do not extend to embrace point 3). In a similar manner, either, as is shown in FIG. 6, if no transparency is desired at point 4, then 100% of channel A may appear whereas 0% of channel C and 0% of the background may appear thereby causing any channel C image and any background image to be completely hidden at point 4, or, as is not shown in FIG. 6, if transparency is desired at point 4, some portion of channel A may appear so as to allow some other portion of the channel C image to be shown. In a parallel fashion and allowing for a different amount of transparency at point 5, some portion, say 75%, of channel B may appear while some other portion, say 25%, of channel A appears and 0% of channel C appears. Thus, at point 5, channel B is transparent to allow some of channel A to be shown while channel A is not transparent so as to block out, or hide, channel C and the background.

Returning to FIG. 1, channel input/output (I/O) interface 20 receives a plurality of image information signals $V_i$ and a plurality of related input key data $Bk_i$ from an external source. The image signals are extended over bus 30 to be received at inputs of cutter means 600 while the input key data signals are extended over bus 40 to be received at inputs of keyer means 200/300/400/500 for producing processed key signals $Pk_i$. The processed key signals are then extended over bus 50 to other inputs of cutter means 600. Cutter means 600 cuts the image information signals $V_i$ by the processed key signals $Pk_i$. The thusly cut image signals are extended over bus 70 to adder means 700 where they are combined to form the image signal combine $V_C$, which is provided over bus 80 to I/O interface 60 and thence to an external output.

Figure 2:
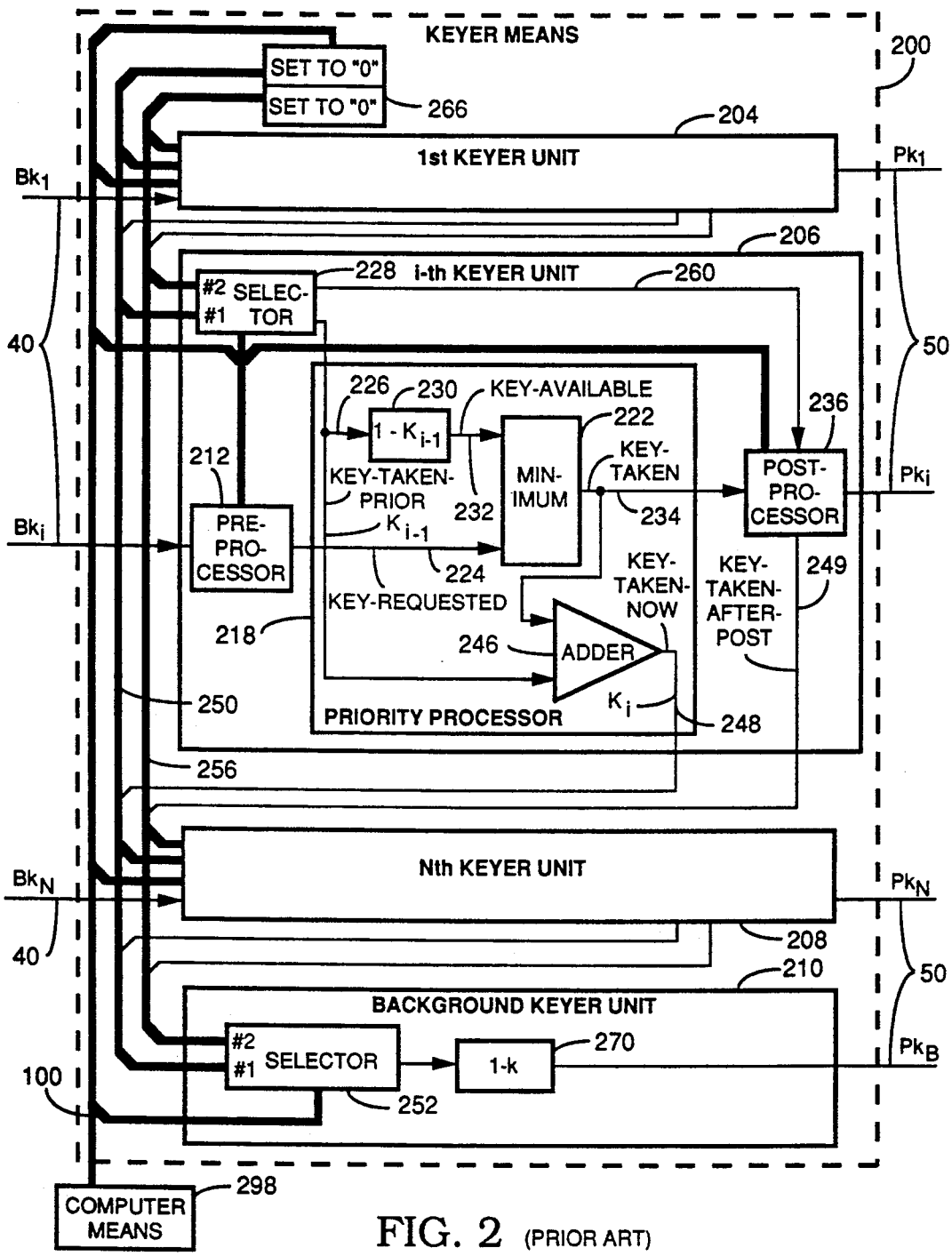
FIG. 2 is a block diagram illustration of a prior art keyer means, which is useful in describing my departure from the prior art.

Turning now to FIG. 2, the priority processing among the various image signal channels can be embodied in a keyer means 200 and therein in one or more substantially identical keyer units such as substantially identical keyer units 204, 206 and 208. Since each of the keyer units 204, 206 and 208 is substantially identical, the following detailed description can focus on any one keyer unit here on keyer unit 206, which is the i-th keyer unit and which includes, among other things, a respective priority processor such as prior art priority processor 218 for producing processed image key signals.

From the above examples, it ought to be noted that processed key signals ($Pk_1, Pk_2, Pk_3, \ldots, Pk_N, Pk_B$) have the property above stated for equation (4) that $Pk_1+Pk_2+\ldots+Pk_N+Pk_B=1.0$. As also mentioned above, the input key signals ($Bk_1, Bk_2, Bk_3, \ldots, Bk_N$) may, but need not, have the property that they sum to unity. Instead, the input key signals have the properties stated in equation (3) above. As will shortly be made more clear, this distinction can be embodied in a keyer means like prior art keyer means 200. As a foundation to describing an embodiment of the distinction, the description now reviews a description of processing input key signals $Bk_i$ to produce processed key signals $Pk_i$ having the following properties:

$$Pk_1 = Bk_1 \tag{5}$$

$$Pk_2 = \text{Min}(1 - Pk_1, Bk_2)$$

$$Pk_3 = \text{Min}(1 - Pk_1 - Pk_2, Bk_3)$$

$$Pk_N = \text{Min}\left(1 - \sum_{j=1}^{N-1} Pk_j, Bk_N\right)$$

$$Pk_B = 1 - \sum_{j=1}^{N} Pk_j$$

where the symbol $\Sigma$ is an operator, which means the mathematical summation of the argument following the symbol, and where the combined image information signal is given as:

$$V_C = \sum_{i=1}^{N} Pk_i V_i + Pk_B V_B \tag{6}$$

and where, except for the priorly stated assumption that the background channel is the overall lowest priority channel in the combine, subscript i identifies by integer the rank ordering of the channels from i=1 being the highest priority image channel to i=N being the lowest priority image channel.

Input key signals $Bk_i$ may, but need not, be preprocessed to another form of input key signal by preprocessor 212 within keyer unit 206. One form of preprocessor 212 could include a transparency multiplier, which, responsive to a control signal, for example, a control signal in the form of a transparency factor, or coefficient, from a suitably programmed computer means 298 on a bus 100, could modify the transparency of the channel. Computer means 298 could direct the transparency multiplier of preprocessor 212 to multiply input key data $Bk_i$ by the transparency coefficient to provide a "key-requested" signal, which represents an input key signal that has been reduced by the amount of the transparency coefficient. For example, if the transparency coefficient equals unity, there is no effect on the input key signal $Bk_i$. However, if the transparency coefficient is less than unity, the transparency multiplier of preprocessor 212 reduces the value of the input key signal accordingly. The transparency coefficient key reduction for transparency effects may be changed on a field-by-field basis. Whether the input key signal is preprocessed or not preprocessed, either the preprocessed input key signal or the not-preprocessed input key signal, as the case may be, is extended on a bus 224 as a "key-requested" input to priority processor 218. As an aside, note that in either instance, the key-requested signal is a function of the input key signal $Bk_i$. Accordingly, for ease of description, and not by way of limitation, assume the transparency coefficient is unity and hence that the key requested signal is the input key signal $Bk_i$. Continuing, the key requested signal is coupled within priority processor 218 to one input of a minimum circuit 222. Priority processor 218 also receives a "key-taken-prior" input on a bus 226 from a higher priority resource over bus 250 through a first half of selector 228 under the control of computer means 298. The selector has first and second halves and each half of each selector selects one of its N inputs as that half's output under the control of computer means 298, which provides appropriate control signals over bus 100. The key-taken-prior represents the amount of the key resource that has been taken by all higher priority channels. The key-taken-prior, which is labelled $K_{i-1}$, measures the resource taken by channels having a priority higher than the priority of the i-th channel, i.e. the resource taken by channels 1 through (i−1), and can be stated using standard mathematical notation as:

$$K_{i-1} = \sum_{j=1}^{i-1} Pk_j \qquad (7)$$

where the symbol $K_{i-1}$ represents the key-taken-prior and is also shown in subtracter 230 of FIG. 2 to illustrate the algebraic subtraction of the key-taken-prior from unity. Since from equation (4) the maximum key resource available is unity, the difference between the maximum key resource available, i.e. unity, and the amount of the key resource, which has been taken by higher priority channels, is equal to the remainder of the key resource, which is available for use by the i-th and lower priority channels. Accordingly, the key-taken-prior is fed to subtracter 230, which generates a "key-available" on a bus 232. As an aside, since the entirety of the key resource is unity, it should be clear that the summation of (a) all of the key resource that has already been taken, which is equivalent to the key-taken-prior, and (b) all of the key resource that has not already been taken, which is equivalent to the key-available, is also unity.

Continuing, the minimum circuit 222 provides an output, which is the minimum value as between the key-available and the key-requested inputs on buses 232 and 224, respectively. The output of minimum circuit 222 on a bus 234 is labeled "key-taken" and is one form of processed image key signal for the i-th channel. The key-taken signal on bus 234 may, but need not, be post-processed to another form of processed image key signal by postproccesor 236 within keyer unit 206. One form of postprocessor 236 could include a dimness multiplier, which, responsive to a control signal, for example, a control control signal in the form of a dimness factor, or coefficient, from a suitably programmed computer means 298 on a bus 100 dims the channel, for example, by multiplying the dimness factor and the key-taken signal to generate a key-taken-after-dimming signal, and could communicate the extent of the dimness over a bus 249 onto a bus 256 as a modified key-taken signal, here called a "key-taken-after-post" signal. Bus 256 is coupled to all N image signal keyer units as well as to all background keyer units so that the key-taken-after-post signal can be coupled to the next lower priority keyer unit, e.g. the (i+1)-st keyer unit through a second half of its selector unit 228 and thence over bus 260 to an input of an adder within postprocessor 236. The adder in postprocessor 236 adds the key-taken-after-dimming to the key-taken-after-post from the (i−1)-st channel to generate the key-taken-after-post on bus 249 for the i-th channel.

The dimming function can be viewed as similar in function to the transparency function of the multiplier of preprocessor 212. In dimming the channel, a portion of the background video is forced back into the i-th channel image signal without affecting any lower priority channels. A dimness multiplier is used because, once the key-taken output on bus 234 is generated for the i-th channel, the key-taken value is not reduced further because to do so could adversely affect the operation of any lower priority channels which use the key-taken signal from the i-th channel. Notwithstanding, there are instances in which it may be desirable to reduce the value, e.g. to dim the processed key signal of a channel. Accordingly, the dimness multiplier allows for altering the key-taken output to a smaller value, in response to a dimness factor or coefficient supplied from computer means 298 over bus 100 to postprocessor 236. As with the transparency coefficient, if a dimness factor of unity is provided by computer means 298, there is no reduction in the key-taken output and the processed key signal $Pk_i$ is equal to the key-taken signal. However, if the dimness factor is less than unity, the dimness multiplier of postprocessor 236 reduces the value of the key-taken signal and the processed key signal $Pk_i$ is equal to the key-taken signal as reduced by the dimness factor, which is also called the "key-taken-after-dimming" signal. Whether the key-taken signal on bus 234 is postprocessed or not post-processed, either the post-processed key-taken signal or the not-post-processed key-taken signal, as the case may be, is extended as processed image key signal $Pk_i$ on a bus 50 to a cutter means 600, which cuts the respective image information signal $V_i$. As an aside, note that in either instance, the processed image key signal $Pk_i$ is a function of the key-taken signal. Accordingly, for ease of description, and not by way of limitation, assume the dimness coefficient is unity and hence that the key-taken signal is the processed key signal $Pk_i$. Continuing, the cut image signals are then extended on bus 70, through an adder means 700 for combining the plurality of image information signals and for generating on bus 80 the combined image signal $V_C$ and for providing the combine signal to input-output interface 60.

The key-taken output on bus 234 and the key-taken-prior input on the bus 226 are supplied to respective inputs of an adder 246, which sums the respective inputs and provides a "key-taken-now" output on a bus 248. The key-taken-now output on a bus 248 is a combination of the key resource that was taken by all higher priority channels and of the key resource taken by the i-th channel. Stated somewhat differently, the key-taken-now, which is labelled $K_i$, measures that amount of the key resource, which has been taken by all channels having at least the priority of the i-th channel, i.e. the resource taken by channels 1 through i, and can be stated using standard mathematical notation as:

$$K_i = \sum_{j=1}^{i} Pk_j \qquad (8)$$

where the symbol $K_i$ represents the key-taken-now.

The key-taken-now output $K_i$ can be coupled over bus 248 to a bus 250, which extends through all of the keyer units for all N image signal channels as well as through all of the keyer units for all background channels, here the one background keyer unit 210. Even more particularly, the key-taken-now output on a bus 248 can be extended, under the control of suitably programmed computer means 298, which provides appropriate control signals over bus 100 to the respective selectors, over bus 250 from the i-th keyer unit, which is illustrated as keyer unit 206, to the next lower priority keyer unit, i.e. to the (i+1)-st keyer unit, and therein through the first half of its selector 228 as a key-taken-prior input on bus 226.

Regarding the details and use of minimum circuit 222, it may be noted that the minimum circuit 222 performs a straightforward minimum value select, and includes a comparator, which compares its respective inputs to determine which is the smaller, and a selector which then selects the smaller of the inputs and provides that smaller input to an output of minimum circuit 222. It may also be noted that minimum circuit 222 serves at least two other functions. First, consider the condition that the key-taken by all higher priority channels is such that not all of the maximum key resource available has been taken through the (i−1)-st channel, i.e. $K_{i-1}$ is less than unity, and also consider the condition that the i-th channel needs and would take some of the key resource if any is available. In this case, some of the resource can be taken by the i-th channel since not all of the resource was previously taken by higher priority channels. That is, the i-th channel can have all the resource it needs as long as the value of the key available on bus 232 is equal to or greater than the value of the key-requested on bus 224. Second, consider the condition that the i-th channel needs some amount of the key resource, but the key-available on bus 232 is zero, i.e. $K_{i-1}$ equals unity. In this case and in view of the condition that the channel can have only so much of the resource as is available, which in this case is none, the channel gets none of the key resource. To further explain why the channel gets none of the key resource, it should be borne in mind that the condition represented by $K_{i-1}$ equalling unity has the meaning that the higher priority resources have taken all of the key resource, which also means that the constraint represented by equation (4) has been met at a higher priority channel.

Regarding the first, and highest priority, keyer unit 204, it may remembered from equation (5) that $Pk_1$ is equal to $Bk_1$. Parenthetically, it is worth repeating that in this description the key-requested signal is a function of the input key signal $Bk_i$ and the processed image key signal $Pk_i$ is a function of the key-taker signal. Further, in this description, the preprocessing transparency coefficient is assumed to be unity and hence the key requested signal is the input key signal $Bk_i$ while the post-processing dimness coefficient is assumed to be unity and hence the key-taken signal is the processed key signal $Pk_i$. Accordingly, while equation (5) may need to be modified to account for the functional relationships stemming from any preprocessing or post-processing of the key signals, the functional modification process will be clear to the skilled artworker from the teachings of this description. Continuing, the foregoing identity between $Pk_1$ and $Bk_1$ can be embodied by use of apparatus 266, which, under the control of suitably programmed computer means 298, (a) provides a key-taken-prior having a zero value (meaning that none of the key resource has been taken, or used) over bus 250 to the first, and highest priority, keyer unit 204 and therein through the first half of its selector 228 to its bus 226 as well as (b) provides a key-taken-after-post having a zero value (meaning also that none of the key-taken-after-dimming has been taken) over bus 256 also to the first, and highest priority, keyer unit 204 and therein through the second half of its selector 228 to its bus 260 for use by any postprocessor 236. With key-requested equal to $Bk_1$ on bus 224 of first keyer unit 204 being provided to a first input of minimum circuit 222 and with apparatus 266 providing a value of zero to subtracter 230, which in turn provides an output value of unity to a second input of minimum circuit 222, keyer unit 204 is embodied to assure that the key-taken output of keyer unit 204 is equal to $Bk_1$. In similar fashion, if there is a postprocessor 236, with apparatus 266 providing a value of zero to an adder input of postprocessor 236, keyer unit 204 is embodied to assure that the key-taken-after-post output of keyer unit 204 on bus 249 is equal to the key-taken-after-dimming.

Regarding the last, and lowest priority, keyer unit 210, it may be remembered from equation (4) and noted from equation (5) that the processed background key signal $Pk_B$ plus the summation of the processed image key signals $Pk_i$ over all N image information channels is equal to unity. Therefore, the last, background signal, keyer unit 210 may be embodied using subtracter 270 in lieu of subtracter 230 so that, under the control of computer means 298 and the control signals it provides to bus 100, subtracter 270 subtracts from unity, which is the maximum resource available, either (a) the key-taken-now output $K_N$ of the N-th, and lowest priority image information channel, keyer unit 208 (recall equation (8)) on buses 248 and 250, which key-taken-now can be extended through the first half of selector 252 when there is no post-processing or (b) the key-taken-after-post output of the N-th, and lowest priority image information channel, keyer unit 208, on buses 249 and 256, which key-taken-after-post can be extended through the second half of selector 252 whether or not there is post-processing. In that manner, all of the remaining key resource, which happens to be available and which is mathematically equal to $(1-k)$ where k is either of the aforesaid the key signal inputs to subtracter 270, can be taken by the background channel at the output of subtracter 270, thereby satisfying the maximum key resource constraint of equations (4) and (5).

Regarding selector 228 and suitably programmed computer means 298, the combiner includes means for automatically determining the priority of the channels and the spatial order of the video images in a combine, on a dynamic and continuous field-by-field basis, as well as switchably changeable means for rank ordering the plurality of keyer units like keyer units 204, 206 and 208 so that the priority attached to any specific one of the plurality of keyer units is also dynamically and continuously switchably changeable, even on a field-by-field basis. In that manner, the priority of the individual keyer units can be dynamically modified so as to be in one-to-one correspondence with the desired spatial order of the video images $V_i$. Thus, for example, as video images in a composite video image change positions, the order of their priorities also can be changed automatically so that the channel whose image is in front has the highest priority, etc. Thereby, the combiner switches its keyer units rather than switching its video image inputs.

Further, the process can be used in an automatic priority selection mode to continuously determine in real time which channels are in front of which other channels. The N channels are then spatially ordered from the highest priority to the lowest priority. The data generated is used by the computer means 298 to enable respective channel selectors (e.g., selector 228 of the i-th keyer unit 206), in response to control signals provided by computer means 298 over bus 100, to select the channels in the order determined by the above process on a field-by-field basis. The computer means 298 simultaneously changes respective time delays of the channels in accordance with the priority changes. It is to be understood that the priority selection also can be manually programmed and/or can be a combination system employing both manual and automatic priority programming of the respective channels. Again, note that rather than switching video input signals, the described prior art combiner switches among the keyer units in its keyer means to reflect real time changes in the priority of the video signals.

So much for a description of a prior art combiner, which, as will shortly be understood, is very helpful in the transition from the prior art to an understanding of the principles of my invention. To further assist in that transition, we now turn to a numerical example of a keyed transparency image information combine. Consider two image information channels, called channel 1 and channel 2. Consider further that channel 1 is 50% transparent and that channel 2 is 60% transparent. That could mean that the input key signal $Bk_1$ for channel 1 could have a value of 0.5 and that the input key signal $Bk_2$ for channel 2 could have a value of 0.6. Note in this example, that the summation of the input key values is greater than unity, i.e. ($Bk_1 + Bk_2 = 1.1$). Consider still further that channel 1 has a higher priority than channel 2. That would mean that channel 1 images are in the foreground and closer to the viewer than are channel 2 images. Now recall the earlier description relative to equation (5), which would give rise to processed image key signals of:

$$Pk_1 = Bk_1 = 0.5 \qquad (9)$$
$$Pk_2 = \text{Min}(1 - Pk_1, Bk_2) = (1 - 0.5, 0.6) = 0.5$$

Note in this example, that the summation of the values of the processed image key signals $Pk_i$ is unity, i.e. ($Pk_1 + Pk_2 = 1.0$). Accordingly, following the constraints of equation (5), any background signal would be cut to zer since $Pk_B$ would equal zero. Also, note that the above would mean that the video image of channel 1 would be cut by 50% and the video image of channel 2 would also be cut by 50%. That implies that the transparency of channel 2 images would be reduced from 60% to 50% when channel 2 images are viewed through any higher priority channel 1 transparent images, which themselves have a transparency of 50%. The visual result can be disturbing.

The visual result can be significantly improved, and an improved special effect occurs, in a true-transparency embodiment of the principles of my invention.

Now for an example of true-transparency, which assumes the numbers of the earlier described example. In view of the channel 1 image requesting a key resource of 50% and in view of the channel 2 image requesting a key resource of 60% and in view of the channel 2 image having a lower priority than the channel 1 image, it may be recognized that the key resource taken by channel 2 may need to be reduced from the key resource requested by channel 2 in view of the higher priority of channel 1. Taking the case at hand, when a higher priority image is displayed relative to a lower priority image, a dramatically improved visual special effect occurs when the key taken by channel 2 is reduced employing the principles of my invention. Staying with the above example, in light of channel 1 requesting a key resource of 50%, any combine of a high priority channel 1 image with a lower priority channel 2 image ought to have the lower priority channel image modified accordingly. Hence, assume the high priority channel 1 image is combined with, and placed in front of, the lower priority channel 2 image. A dramatically improved visual special effect, and a significant improvement, occurs when channel 2 images are cut by a true transparency processed key signal $Pk_2$ of 30% [$= Bk_2\{1 - Bk_1\} = 0.6 \times \{1.0 - 0.5\}$], rather than the prior art key taken of 50%, and when the higher priority channel 1 images are cut by a processed key signal $Pk_1$ [$= Bk_1$] of 50%, as before, and when the remaining portion of the key resource is employed to cut a generated background signal $V_B$ by 20% [$= \{1 - Bk_2\}\{1 - Bk_1\} = \{1.0 - 0.6\}\{1.0 - 0.5\} = \{1 - Pk_1 - Pk_2\}$], rather than the prior art 0%. As a result, the visual special effect gives rise to a more natural and real transparency effect, hence the name "true transparency".

Accordingly, my improved keyed, true-transparency image information combine includes a priority processor that processes input key signals $Bk_i$ to produce processed image key signals $Pk_i$ in such a manner that the value of the input key signal $Bk_i$ in the i-th priority channel is modified by the values of the input key signals $Bk_j$ from the higher priority channels to generate a true transparency processed key signal $Pk_i$ for the i-th priority channel. The result is that my priority processor embodies the following true-transparency properties:

$$Pk_1 = Bk_1 \qquad (10)$$
$$Pk_2 = Bk_2(1 - Bk_1)$$
$$Pk_3 = Bk_3(1 - Bk_2)(1 - Bk_1)$$
$$Pk_N = Bk_N \prod_{j=1}^{N} (1 - Bk_{j-1})$$
$$Pk_B = \prod_{j=1}^{N} (1 - Bk_j)$$

where $Bk_0 = 0$ and where the symbol $\Pi$ is an operator, which means the mathematical product of the argument following the symbol and where it may be noted that following mathematical identity exists:

$$Pk_B = \prod_{j=1}^{N} (1 - Bk_j) = 1 - \prod_{j=1}^{N} Pk_j \qquad (11)$$

and where the image information signal combine $V_C$ is given as:

$$V_C = \sum_{i=1}^{N} Pk_i V_i + Pk_B V_B, \text{ or} \qquad (12)$$

$$V_C = \sum_{i=1}^{N} V_i Bk_i \prod_{j=1}^{i} (1 - Bk_{j-1}) + Pk_B V_B$$

and where $V_B$ is a background signal.

Figure 3:
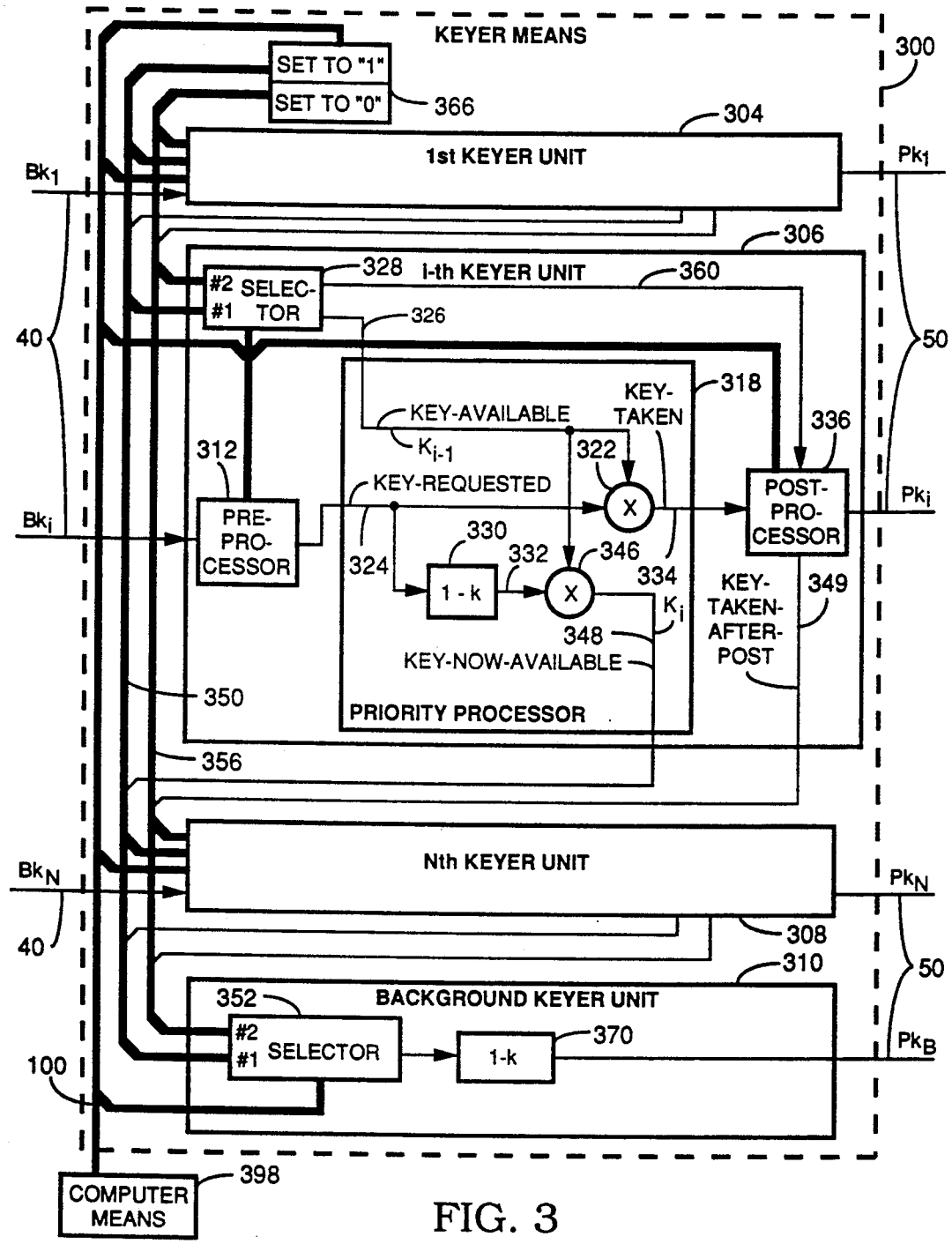
FIGS. 3, 4 and 5 are block diagram illustrations of alternative improved keyer means, which are useful in describing the principles of my invention.

Turning now to FIG. 3, the priority processing among the various image signal channels can be embodied in an improved keyer means 300 and therein in one or more substantially identical but improved keyer units such as keyer units 304, 306 and 308. As an aside, the keyer units are substantially identical in the sense that, while there may be some structural distinctions among the keyer units, there is a commonality of function among the keyer units within a keyer means. For example, and as should become clear from the ensuing description, keyer units of the types shown respectively in FIGS. 3, 4 and 5, although they have structural distinctions, which will shortly be pointed out, have a commonality of function and could be embodied in one single keyer means as a plurality of substantially identical keyer units. Continuing, since each of keyer units 304, 306 and 308 is substantially identical, the following detailed description can focus on any one keyer unit here the focus is on keyer unit 306, which is also the i-th keyer unit and which includes, among other things, a respective and improved priority processor 318 for producing processed key signals $Pk_i$, which are useful for improving the transparency of the image information signal combine, by modifying the value of the input key signal $Bk_i$ in the i-th priority channel with the values of the input key signals $Bk_j$ in the higher priority channels to generate a processed key signal $Pk_i$ for the i-th priority channel. Thereby, a keyed, true-transparency combine is obtainable.

Input key signals $Bk_i$ may, but need not, be preprocessed to another form of input key signal by preprocessor 312 within keyer unit 306. As an aside, preprocessor 312, postprocessor 336, computer means 398, bus 100, bus 350 and bus 356 of keyer means 300 in FIG. 3 can operate in the same manner as priorly described for, respectively, preprocessor 212, postprocessor 236, computer means 298, bus 100, bus 250 and bus 256 of keyer means 200 in FIG. 2. Continuing, whether the input key signal is preprocessed or not preprocessed, either the preprocessed input key signal or the not-preprocessed input key signal, as the case may be, is extended on a bus 324 as a "key-requested" input to priority processor 318. As an aside, note that in either instance, the key-requested signal is a function of the input key signal $Bk_i$. Accordingly, for ease of description, and not by way of limitation, assume a preprocessor, which responds to a transparency coefficient of unity, and hence assume that the key requested signal is the input key signal $Bk_i$. Continuing, the key requested signal is coupled within priority processor 318 to one input of a first multiplier 322. Priority processor 318 also receives a "key-available" input on a bus 326 from a higher priority resource over bus 350 through the first half of selector 328 under the control of computer means 398. From one point of view, the key-available $K_{i-1}$ on bus 326 corresponds to the amount of the key resource, which has not been used by higher priority channels. It also corresponds to the maximum amount of key resource available to the i-th channel. The key-available can be stated using standard mathematical notation as:

$$K_{i-1} = \prod_{j=1}^{i-1} (1 - Bk_j) \tag{13}$$

The key-available is fed to another input of multiplier 322. The output of multiplier 322 on a bus 334 is labeled "key-taken" and is one form of processed image key signal for the i-th channel. The key-taken signal on bus 334 may, but need not, be post-processed to another form of processed image key signal by postprocessor 336 within keyer unit 306. As with postprocessor 236 and computer means 298, postprocessor 336 could operate in response to control signals from suitably programmed computer means 398 over bus 100, which couple a dimness factor through the second half of a selector 328 onto a bus 360 to modify the key-taken signal and could operate to communicate the extent of any such modification over a bus 349 onto another bus 356 to lower priority keyer units as a modified key-taken signal, called herein a key-taken-after-post. Whether the key-taken signal on bus 334 is post-processed or not post-processed, either the postprocessed key-taken signal or the not-post-processed key-taken signal, as the case may be, is extended as a processed image key signal $Pk_i$ on a bus 50 to a cutter means 600, which cuts the image information signal $V_i$. The cut image signals are then extended on bus 70, through an adder means 700 for combining the plurality of image information signals and for generating on bus 80 the combined image signal $V_C$ and for providing the combined image signal to input-output interface 60.

The key-requested on bus 324 is also fed to an subtracter 330, which generates a key on a bus 332. The symbol k, which is also shown in subtracter 330 of FIG. 3, is used to illustrate the algebraic subtraction of the key-requested from unity, i.e., in subtracter 330, k equals the key-requested on bus 324. The key on a bus 332 and the key-available input on bus 326 are supplied to respective inputs of second multiplier 346, which multiples the inputs and provides a "key-now-available" output on a bus 348. The key-now-available output on a bus 348 corresponds to the product of (a) the reduction in resource required by all higher priority channels of the i-th channel image and (b) the reduction in resource required by the i-th channel of any lower priority channels. Stated somewhat differently, the key-now-available, which is labelled $K_i$, corresponds to the amount of key by which the key resource is to be reduced by the (i+1)-st channel in view of the lower priority of the (i+1)-st channel relative to the higher priority of channels 1 through i. The key-now-available can be stated using standard mathematical notation as:

$$K_i = \prod_{j=1}^{i} (1 - Bk_j) \tag{14}$$

The key-now-available output $K_i$ can be coupled over bus 348 to a bus 350, which extends through all of the keyer units for all N image signal channels as well as through all of the keyer units for all background channels here, illustratively and not by way of limitation, the one background keyer unit 310. Even more particularly, the key-now-available output on a bus 348 can be extended, under the control of suitably programmed computer means 398, over bus 350 from the i-th keyer unit, which is illustrated as keyer unit 306, to the next lower priority keyer unit, i.e. to the (i+1)-st keyer unit, as its key-available input $K_{i-1}$ on its bus 326 in the next respective lower priority keyer unit.

Regarding the first, and highest priority, keyer unit 304, it may be noted from equation (10) that $Pk_i$ is equal to $Bk_1$. Parenthetically, it is worth repeating again that in this description the key-requested signal is a function of the input key signal $Bk_i$ and the processed image key signal $Pk_i$ is a function of the key-taken signal. Further, in this description, the preprocessing transparency coefficient is assumed to be unity and hence the key requested signal is the input key signal $Bk_i$ while the post-processing dimness coefficient is assumed to be unity and hence the key-taken signal is the processed key signal $Pk_i$. Accordingly, while equation (10) may need to be modified to account for the functional relationships stemming from any preprocessing or post-processing of the key signals, the functional modification process will be clear to the skilled artworker from the teachings of this description. Continuing, the foregoing identity between $Pk_1$ and $Bk_1$ can be embodied by use of apparatus 366, which, under the control of suitably programmed computer means 398, (a) provides a key-available having a unity value (meaning that all of the key resource is available) over bus 350 to the first, and highest priority, keyer unit 304 and therein through the first half of its selector 328 to its bus 326 as well as (b) provides a key-taken-after-post having a zero value (meaning that none of the key-taken-after-dimming has been taken) over bus 356 also to the first, and highest priority, keyer unit 304 and therein through the second half of its selector 328 to its bus 360 for use by any postprocessor 336. With key-requested equal to $Bk_1$ on bus 324 of first keyer unit 304 being provided to a first input of multiplier 322 and with apparatus 366 providing a value of one to a second input of multiplier 322, keyer unit 304 is embodied to assure that the key-taken output of keyer unit 304 is equal to $Bk_1$. In similar fashion, if there is a postprocessor 336, with apparatus 366 providing a value of zero to an adder input of postprocessor 336, keyer unit 304 is embodied to assure that the key-taken-after-post output of keyer unit 304 on bus 349 is equal to the key-taken-after-dimming.

Regarding the last, and lowest priority, keyer unit 310, it may be noted that, in order to satisfy the properties stated in equation (11), all of the key resource that remains available after channels 1 through N have taken their respective portions of the maximum available key resource is the key to be taken by the background channel.

On the one hand, if there is no postprocessor 336 in any of the higher priority keyer units, then the key-now-available on bus 348 from the N-th, or lowest priority image, keyer unit 308 is also both the key-available to, and the key-taken by, the background channel. This can be embodied in keyer unit 310, which, under the control of suitably programmed computer means 398, is provided a key-now-available from the N-th keyer unit 308 over bus 348 of keyer unit 308 thence onto bus 350 and thence through the first half of selector 352 in background keyer unit 310 directly, and without use of subtracter 370, for example, remove subtracter 370 in its entirety from the structure of FIG. 3, to generate the background key signal $Pk_B$, which mathematically is equal to:

$$Pk_B = \prod_{j=1}^{N} (1 - Bk_j) \quad (15)$$

On the other hand, whether there is or there is not a postprocessor 336 in any of the higher priority keyer units, then, equation (11) can be satisfied and the system can be assured that all the remaining resource is taken by the background channel, if the key-taken-after-post from the N-th keyer unit 308 is coupled over bus 349 of keyer unit 308 to bus 356 and thence through the second half of selector 352 in background keyer unit 310 and is the value of k, which is subtracted from unity by subtracter 370, to generate the background key signal $Pk_B$, which mathematically is equal to:

$$Pk_B = 1 - k = 1 - \sum_{j=1}^{N} Pk_j \quad (16)$$

In addition to the above, preprocessor 312 and/or post-processor 336 could, as needed, be included or excluded from use in background keyer unit 310.

Regarding selector 328 and computer means 398, the present combiner can use a selector and computer means of the type used by the combiner in the cited U.S. Pat. No. 4,758,892, which is incorporated herein by reference, for automatically determining in real time changes in the priority among the channels, and for automatically determining in real time the spatial order of the video images in a combine, on a continuous field-by-field basis, as well as switchably changeable means for rank ordering the plurality of keyer units like keyer units 304, 306 and 308 so that the priority attached to any specific one of the plurality of keyer units is also dynamically and continuously switchably changeable, even on a field-by-field basis. Thus, for example, as video images in a composite video image change priority positions, the order of priority among the keyer units also can be changed automatically so that the channel whose image is in front has the highest priority, etc. Thereby, the priority order of the keyer units is switched rather than switching the priority order of the respective video signals. The process can be used in an automatic priority selection mode of the combiner to continuously determine in real time which channels are in front of which other channels. The channels are thereby rank ordered in real time and on a dynamic basis from the highest to the lowest priority. The data generated is used by the computer means 398 to enable respective channel dual selectors (e.g., selector 328 of the i-th keyer unit 306) to select the channels in the order determined by the above process on a field-by-field basis.

Figure 4:
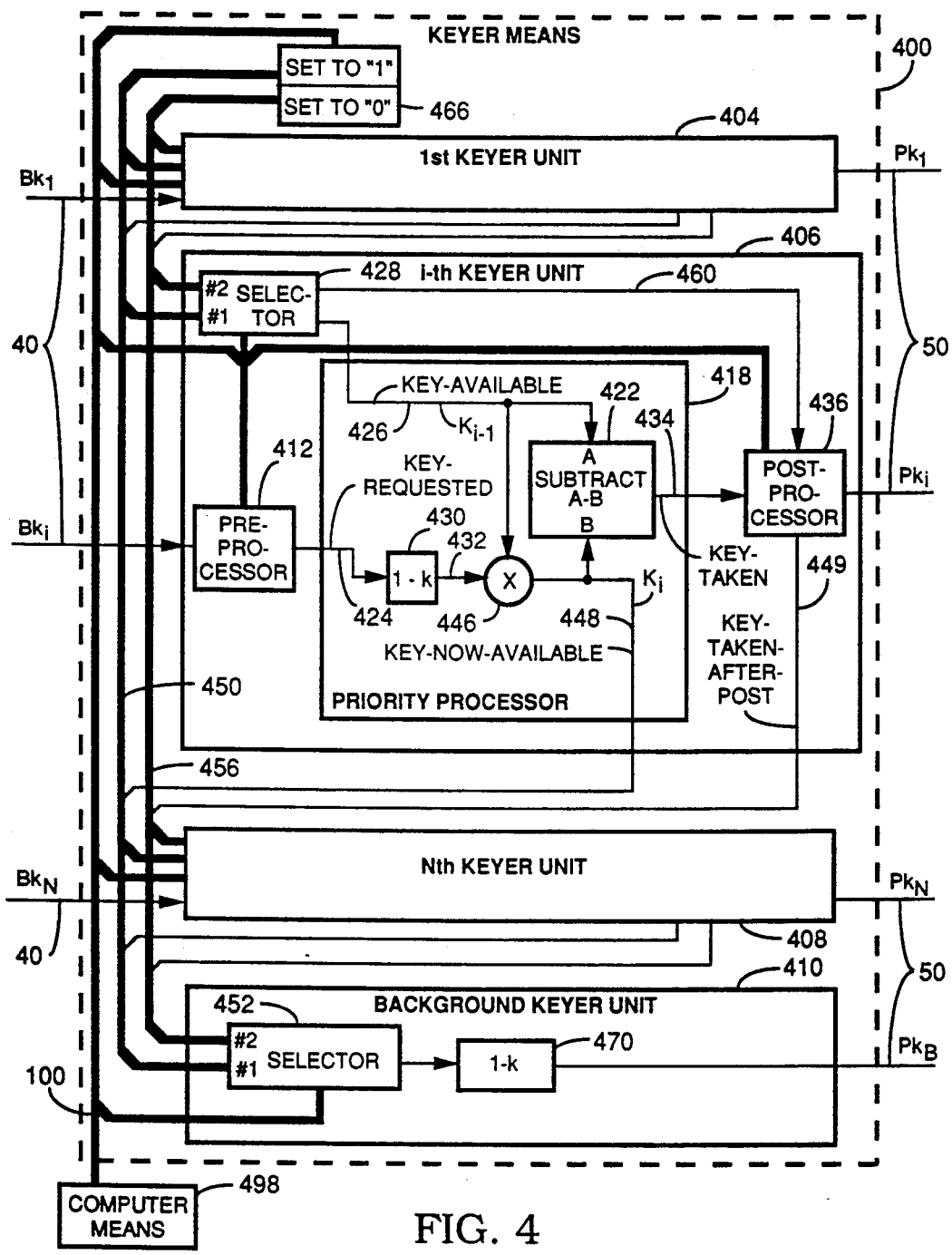

Turning now to FIG. 4, the priority processing among the various image signal channels can be embodied in an alternative and improved keyer means 400 and therein in one or more substantially identical keyer units such as improved keyer units 404, 406 and 408. Since each of the keyer units 404, 406 and 408 is substantially identical, the following detailed description can focus on any one keyer unit here keyer unit 406, which is the i-th keyer unit and which includes, among other things, a respective and improved priority processor 418 for producing processed key signals, which are useful for improving the transparency of the combine image information signal, by modifying the value of the input key signal $Bk_i$ in the i-th priority channel with the values of the input key signals $Bk_j$ in the higher priority channels to generate a processed key signal $Pk_i$ for the i-th priority channel. Thereby, a keyed, true-transparency combine is obtainable.

Input key signals $Bk_i$ may, but need not, be preprocessed to another form of input key signal by preprocessor 412 within keyer unit 406. As an aside, preprocessor 412, postprocessor 436, computer means 498, bus 100, bus 450 and bus 456 of keyer means 400 in FIG. 4 can operate in the same manner as priorly described for, respectively, preprocessor 312, postprocessor 336, computer means 398, bus 100, bus 350 and bus 356 of keyer means 300 in FIG. 3. Continuing, whether the input key signal is preprocessed or not preprocessed, either the preprocessed input key signal or the not-preprocessed input key signal, as the case may be, is extended on a bus 424 as a "key-requested" input to priority processor 418. As an aside, note that in either instance, the key-requested signal is a function of the input key signal $Bk_i$. Accordingly, for ease of description, and not by way of limitation, assume a preprocessor, which responds to a transparency coefficient of unity, and hence assume that the key requested signal is the input key signal $Bk_i$. Continuing, the key requested signal is coupled within priority processor 318 to an input of an subtracter 430. The symbol k, which is also shown in subtracter 430, is used to illustrate that the algebraic subtraction of the key-requested from unity, i.e. in subtracter 430, k equals the key-requested on bus 424. Subtracter 430, which performs the one minus k subtraction, generates another key on a bus 432.

Priority processor 418 also receives a "key-available" input on a bus 426 from a higher priority resource over bus 450 through the first half of selector 428 in response to control signals from computer means 498 over bus 100. From one point of view, the key-available $K_{i-1}$ on bus 426 corresponds to the amount of the key resource, which has not been used by higher priority channels. It also corresponds to the maximum amount of key resource available to the i-th channel. The key-available on bus 426 can be mathematically stated as recited in equation (13) above.

The other key on a bus 432 and the key-available input on the bus 426 are supplied to respective inputs of a multiplier 446, which multiplies the resources and provides a "key-now-available" output on a bus 448.

From one point of view, the key-now-available output on a bus 448 corresponds to the product of (a) the reduction in resource $K_{i-1}$ required by all higher priority channels of the i-th channel image and (b) the reduction in resource $(1-Bk_i)$ required by the i-th channel of any lower priority channels. The key-now-available, which is labelled $K_i$, measures the amount by which the resource is to be reduced by the (i+1)-st channel image in view of the lower priority of the (i+1)-st channel relative to the higher priority of channels 1 through i.

From another point of view, the key-now-available output on a bus 448 corresponds to the amount of key-available resource on bus 426 minus that amount of the key resource taken by the i-th channel, which is the key-taken on bus 434, and hence corresponds to any unused key resource available for use by a lower priority channel like channel (i+1).

From either point of view, the key-now-available $K_i$ on bus 448 can be mathematically stated as recited in equation (14) above.

The key-available on bus 426 is fed to an A input of subtracter 422 while the key-now-available on bus 448 is fed to a B input of subtracter 422, which generates the algebraic difference (A−B). The output of subtracter 422 on a bus 434 is labeled "key-taken", which is indicative that it corresponds to the amount of the key resource, which is taken by the i-th channel, and is one form of processed key signal for the i-th channel. The key-taken signal on bus 434 may, but need not, be post-processed to another form of processed key signal by postprocessor 436 within keyer unit 406. As with postprocessor 336 and computer means 398, postprocessor 436 could operate in response to control signals from suitably programmed computer means 498 over bus 100, which couples, for example, a dimness factor through the second half of a selector 428 onto a bus 460 to modify the key-taken signal and could operate to communicate the extent of any such modification over a bus 449 onto another bus 456 to lower priority keyer units as a modified key-taken signal, called herein a key-taken-after-post. Whether the key-taken signal on bus 434 is post-processed or not post-processed, either the postprocessed key-taken signal or the not-post-processed key-taken signal, as the case may be, is extended as a processed image key signal $Pk_i$ on a bus 50 to a cutter mean 600 which cuts the image information signal $V_i$. The cut image signals are then extended on bus 70, through an adder means 700 for combining the plurality of image information signals and for generating on bus 80 the combined image signal $V_C$ and for providing the combined image signal to input-output interface 60.

The key-now-available output $K_i$ on bus 448 can be coupled to a bus 450, which extends through all of the keyer units for all N image channels as well as through all of the keyer units for all background channels here, illustratively and not by way of limitation, the one background keyer unit 410. Even more particularly, the key-now-available output on a bus 448 can be extended, under the control of suitably programmed computer means 498, over bus 450 from the i-th keyer unit, which is illustrated as keyer unit 406, to the next lower priority keyer unit, i.e. to the (i+1)-st keyer unit, as its key-available input $K_{i-1}$ on its bus 426 in the next lower priority keyer unit.

Regarding the first keyer unit 404, it may be noted from equation (10) that $Pk_1$ is equal to $Bk_1$. Parenthetically, it is worth repeating again that in this description the key-requested signal is a function of the input key signal $Bk_i$ and the processed image key signal $Pk_i$ is a function of the key-taken signal. Further, in this description, the preprocessing transparency coefficient is assumed to be unity and hence the key requested signal is the input key signal $Bk_i$ while the post-processing dimness coefficient is assumed to be unity and hence the key-taken signal is the processed key signal $Pk_i$. Accordingly, while equation (10) may need to be modified to account for the functional relationships stemming from any preprocessing or post-processing of the key signals, the functional modification process will be clear to the skilled artworker from the teachings of this description. Continuing, the foregoing identity between $Pk_1$ and $Bk_1$ can be embodied by use of apparatus 466, which, under the control of suitably programmed computer means 498, (a) provides a key-available having a unity value (meaning that all of the key resource is available) over bus 450 to the first, and highest priority, keyer unit 404 and therein through the first half of selector 428 to its bus 426 as well as (b) provides a key-taken-after-post having a zero value (meaning that none of the key-taken-after-dimming has been taken) over bus 456 also to the first, and highest priority, keyer unit 404 and therein through the second half of its selector 428 to its bus 460 for use by any postprocessor 436. The key-requested, which is equal to $Bk_1$ on bus 424 of first keyer unit 404, is provided to an input of subtracter 430 for subtraction from unity. An output of subtracter 430 is coupled over bus 432 to a first input of multiplier 446 and with apparatus 466 extending a value of one as the key-available jointly to a second input of multiplier 446 and to an A input of subtracter 422 and with an output of multiplier 446 being extended to a B input of subtracter 422 within keyer unit 404, keyer unit 404 is embodied to assure that the key-taken output of keyer unit 404 is equal to $Bk_1$. In similar fashion, if there is a postprocessor 436, with apparatus 466 providing a value of zero to an adder input of postprocessor 436, keyer unit 404 is embodied to assure that the key-taken-after-post output on bus 449 of first keyer unit 404 is equal to the key-taken-after-dimming.

Regarding the last, and lowest priority, keyer unit 410, it may be noted that, in order to satisfy the properties stated in equation (11), all of the key resource that remains available after channels 1 through N have taken their respective portions of the maximum available key resource is to be taken by the background channel.

On the one hand, if there is no postprocessor 436 in any of the higher priority keyer units, then the key-now-available from the N-th, or lowest priority image, keyer unit 408 is also both the key-available to and the key-taken by the background channel. This can be embodied in keyer unit 410, which, under the control of suitably programmed computer means 498, is provided a key-now-available from the N-th keyer unit 408 over bus 448 of keyer unit 408 to bus 450 and thence through the first half of selector 452 in background keyer unit 410 directly, and without use of subtracter 470, for example, remove subtracter 470 in its entirety from the structure of FIG. 4, to generate the background key signal $Pk_B$, which mathematically is equal to equation (15).

On the other hand, whether there is or there is not a postprocessor 436 in any of the higher priority keyer units, then, equation (11) can be satisfied and the system can be assured that all the remaining resource is taken by the background channel, if the key-taken-after-post from the N-th keyer unit 408 is coupled over bus 449 of keyer unit 408 to bus 456 and thence through the second half of selector 452 in background keyer unit 410 and, shown by the symbol k, is subtracted from unity by subtracter 470 to generate the background key signal $Pk_B$, which mathematically is equal equation (16).

In addition to the above, preprocessor 412 and/or post-processor 436 could, as needed, be included or excluded from in background keyer unit 410.

Regarding selector 428 and computer means 498, keyer means 400 can use as selector 428 either selector 328 or 228 and as computer means 498 either computer means 398 or 298, as described above, which can be of the type used by the combiner of the cited U.S. Pat. No. 4,758,892, which is incorporated herein by reference, for automatically determining the priority of the channels, and the rank order of the video images in a combine, on a continuous, real-time field-by-field basis, as well as switchably changeable means for rank ordering the plurality of keyer units like keyer units 404, 406 and 408 so that the priority attached to any specific one of the plurality of keyer units is also dynamically and continuously switchably changeable, even on a field-by-field basis.

It should be noted that certain advantages emanate from the distinctly different embodiments of keyer unit 406 and keyer unit 306. For example, keyer unit 406 includes two subtracters and one multiplier whereas keyer unit 306 includes one subtracter and two multipliers. Inasmuch as fast multipliers are, in the present state of the art, relatively expensive and inasmuch as fast subtracters are, in the present state of the art, relatively inexpensive, the embodiment of keyer unit 406 is less costly than the embodiment of keyer unit 306.

Figure 5:
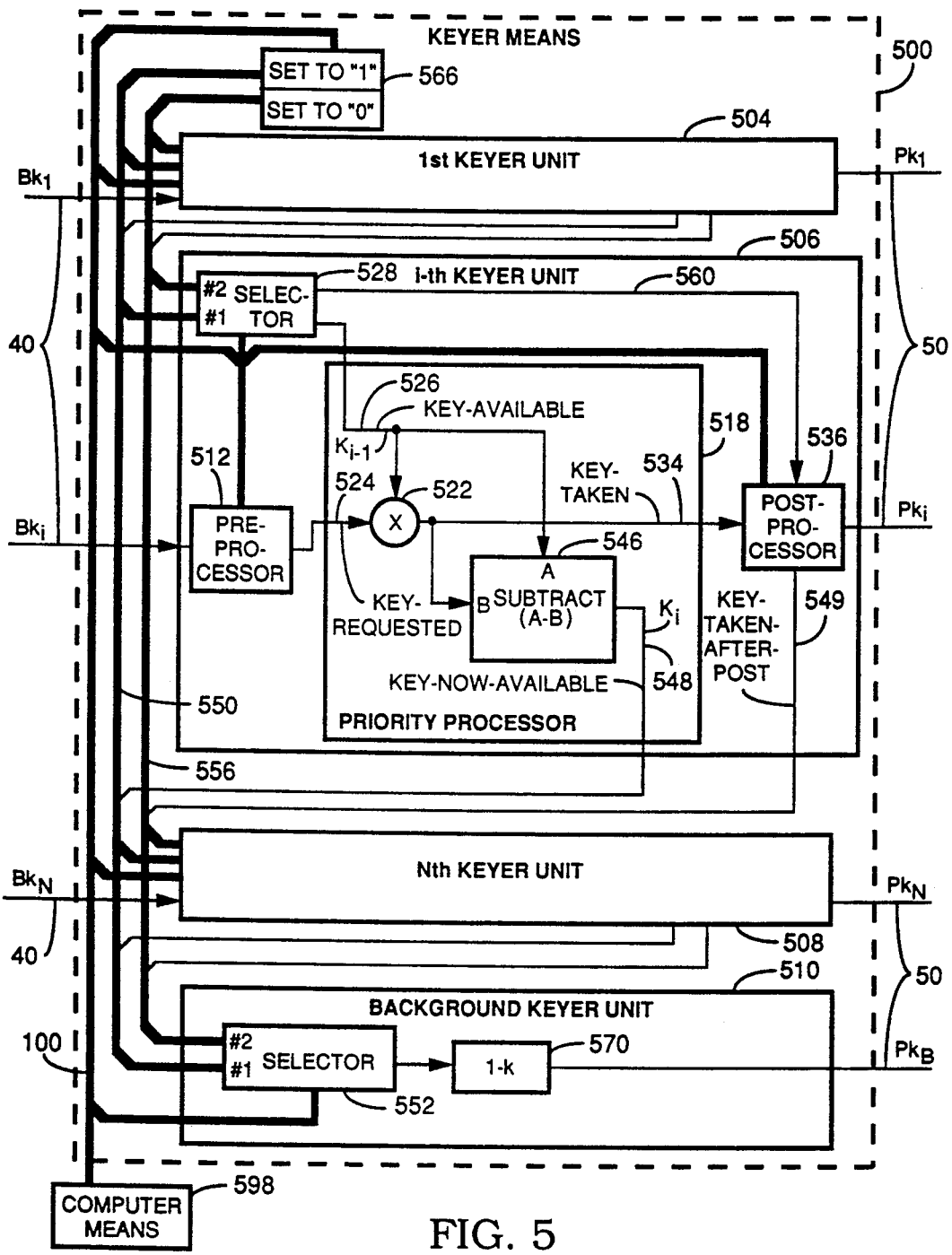

Turning now to FIG. 5, the priority processing among the various image signal channels can be embodied in still another alternative and improved keyer means 500 and therein in one or more substantially identical keyer units such as improved keyer units 504, 506 and 508. Since each of the keyer units 504, 506 and 508 is substantially identical, the following detailed description can focus on any one keyer unit here keyer unit 506, which is the i-th keyer unit and which includes, among other things, a respective and improved priority processor 518 for producing processed key signals $Pk_i$, which are useful for improving the transparency of the image information signal combine, by modifying the value of the input key signal $Bk_i$ in the i-th priority channel with the values of the input key signals $Bk_j$ in the higher priority channels to generate a processed key signal $Pk_i$ for the i-th priority channel. Thereby, a keyed, true-transparency combine is obtainable.

Input key signals $Bk_i$ may, but need not, be preprocessed to another form of input key signal by preprocessor 512 within keyer unit 506. As an aside, preprocessor 512, postprocessor 536, computer means 598, bus 100, bus 550 and bus 556 of keyer means 500 in FIG. 5 can operate in the same manner as priorly described for, respectively, preprocessor 412, postprocessor 436, computer means 498, bus 100, bus 450 and bus 456 of keyer means 400 in FIG. 4 or in the same manner as priorly described for, respectively, preprocessor 312, postprocessor 336, computer means 398, bus 100, bus 350 and bus 356 of keyer means 300 in FIG. 3. Continuing, whether the input key signal is preprocessed or not preprocessed, either the preprocessed input key signal or the not-preprocessed input key signal, as the case may be, is extended on a bus 524 as a "key-requested" input to priority processor 518. As an aside, note that in either instance, the key-requested signal is a function of the input key signal $Bk_i$. Accordingly, for ease of description, and not by way of limitation, assume a preprocessor, which responds to a transparency coefficient of unity, and hence assume that the key requested signal is the input key signal $Bk_i$. Continuing, the key requested signal is coupled within priority processor 518 to a first input of multiplier 522.

Priority processor 518 also receives a "key-available" input on a bus 526 from a higher priority resource over bus 550 through the first half of selector 528 in response to control signals from computer means 598 over bus 100. The key-available input is extended to a second input of multiplier 522. An output of multiplier 522 is provided as a "key taken" on a bus 534 and is one form of processed key signal for the i-th channel.

From one point of view, the key-available $K_{i-1}$ on bus 526 corresponds to the amount of the key resource, which has not been used by higher priority channels. It also corresponds to the maximum amount of key resource available to the i-th channel. The key-available on bus 526 can be mathematically stated as recited in equation (13) above. The key-available on bus 526 is also fed to an A input of subtracter 546 while the key-taken on bus 534 is fed to a B input of subtracter 546, which generates the algebraic difference (A−B). The output of subtracter 546 is labeled "key-now-available" on a bus 548.

From one point of view, the key-now-available output on a bus 548 corresponds to the product of (a) the reduction in resource $K_{i-1}$ required by all higher priority channels of the i-th channel image and (b) the reduction in resource $(1-Bk_i)$ required by the i-th channel of any lower priority channels. The key-now-available, which is labelled $K_i$, measures the reduction in resource to be taken by the (i+1)-st channel image in view of the lower priority of the (i+1)-st channel relative to the higher priority of channels 1 through i.

From another point of view, the key-now-available output on a bus 548 corresponds to the amount of key-available resource on bus 526 minus that amount of the key resource taken by the i-th channel, which is on bus 534, and hence corresponds to any unused key resource thereafter available for use by a lower priority channel like channel (i+1).

From either point of view, the key-now-available can be mathematically stated as recited in equation (14) above.

The key-taken signal on bus 534 may, but need not, be post-processed to another form of processed key signal by postprocessor 536 within keyer unit 506. As with postprocessor 336 and computer means 398 and as with postprocessor 436 and computer means 498, postprocessor 536 could operate in response to control signals from suitably programmed computer means 598 over bus 100, which couple, for example, a dimness factor through the second half of a selector 528 onto a bus 560 to modify the key-taken signal and could operate to communicate the extent of any such modification over a bus 549 onto another bus 556 to lower priority keyer units as a modified key-taken signal, called herein a key-taken-after-post. Whether the key-taken signal on bus 534 is post-processed or not post-processed, either the postprocessed key-taken signal or the not-post-processed key-taken signal, as the case may be, is extended as a processed image key signal $Pk_i$ on a bus 50 to a cutter means 600, which cuts the image information signal $V_i$. The cut image signals are then extended on bus 70, through an adder means 700 for combining the plurality of image information signals and for generating on bus 80 the combined image signal $V_C$ and for providing the combined image signal to input-output interface 60.

The key-now-available output $K_i$ on bus 548 can be coupled to a bus 550, which extends through all of the keyer units for all N image channels as well as through all of the keyer units for all background channels here, illustratively and not by way of limitation, the one background keyer unit 510. Even more particularly, the key-now-available output on a bus 548 can be extended, under the control of suitably programmed computer means 598, over bus 550 from the i-th keyer unit, which is illustrated as keyer unit 506, to the next lower priority keyer unit, i.e. to the (i+1)-st keyer unit, as its key-available input $K_{i-1}$ on its bus 526 in the next respective lower priority keyer unit.

Regarding the first, and highest priority, keyer unit 504, it may be noted from equation (10) that $Pk_1$ is equal to $Bk_1$. Parenthetically, it is worth repeating again that in this description the key-requested signal is a function of the input key signal $Bk_i$ and the processed image key signal $Pk_i$ is a function of the key-taken signal. Further, in this description, the preprocessing transparency coefficient is assumed to be unity and hence the key requested signal is the input key signal $Bk_i$ while the post-processing dimness coefficient is assumed to be unity and hence the key-taken signal is the processed key signal $Pk_i$. Accordingly, while equation (10) may need to be modified to account for the functional relationships stemming from any preprocessing or post-processing of the key signals, the functional modification process will be clear to the skilled artworker from the teachings of this description. Continuing, the foregoing identity between $Pk_1$ and $Bk_1$ can be embodied by use of apparatus 566, which, under the control of suitably programmed computer means 598, (a) provides a key-available having a unity value (meaning that all of the key resource is available) over bus 550 to the first, and highest priority, keyer unit 504 and therein through the first half of selector 528 to its bus 526 as well as (b) provides a key-taken-after-post having a zero value (meaning that none of the key-taken-after-dimming has been taken) over bus 556 also to the first, and highest priority, keyer unit 504 and therein through the second half of its selector 528 to its bus 560 for use by any postprocessor 536. The key-requested, which is equal to $Bk_1$ on bus 524 of first keyer unit 504, is provided to the first input of multiplier 522. With apparatus 466 extending a value of one as the key-available to the second input of multiplier 522 and with the output of multiplier 522 being the key-taken, keyer unit 504 is embodied to assure that the key-taken output on bus 534 of keyer unit 504 is equal to $Bk_1$. In similar fashion, if there is a postprocessor 536, with apparatus 566 providing a value of zero through the second half of of selector 528 in response to control signals from computer means 598 over bus 100 to an adder input of postprocessor 536, keyer unit 504 is embodied to assure that the key-taken-after-post output on bus 549 of first keyer unit 504 is equal to the key-taken-after-dimming.

Regarding the last, and lowest priority, keyer unit 510, it may be noted that, in order to satisfy the properties stated in equation (11), all of the key resource that remains available after channels 1 through N have taken their respective portions of the maximum available key resource is to be taken by the background channel.

On the one hand, if there is no postprocessor 536 in any of the higher priority keyer units, then the key-now-available from the N-th, or lowest priority image, keyer unit 508 is also both the key-available to and the key-taken by the background channel. This can be embodied in keyer unit 510, which, under the control of suitably programmed computer means 598, is provided a key-now-available from the N-th keyer unit 508 over bus 548 of keyer unit 508 to bus 550 and thence through the first half of selector 552 in background keyer unit 510 directly, and without use of subtracter 570, for example, remove subtracter 570 in its entirety from the structure of FIG. 5, to generate the background key signal $Pk_B$, which mathematically is equal to equation (15).

On the other hand, whether there is or there is not a postprocessor 536 in any of the higher priority keyer units, then, equation (11) can be satisfied and the system can be assured that all the remaining resource is taken by the background channel, if the key-taken-after-post from the N-th keyer unit 508 is coupled over bus 549 of keyer unit 508 to bus 556 and thence through the second half of selector 552 in background keyer unit 510 and is subtracted from unity by subtracter 570 to generate the background key signal $Pk_B$, which mathematically is equal to equation (16).

In addition to the above, preprocessor 512 and/or post-processor 536 could, as needed, be included or excluded from in background keyer unit 510.

Regarding selector 528 and computer means 598, keyer means 500 can use as selector 528 either selector 428 or 328 or 228 and as computer means 598 either computer means 498 or 398 or 298, as described above, which can be of the type used by the combiner of the cited U.S. Pat. No. 4,758,892, which is incorporated herein by reference, for automatically determining the priority of the channels, and the rank order of the video images in a combine, on a continuous, real-time field-by-field basis, as well as switchably changeable means for rank ordering the plurality of keyer units like keyer units 504, 506 and 508 so that the priority attached to any specific one of the plurality of keyer units is also dynamically and continuously switchably changeable, even on a field-by-field basis.

It should be noted that certain advantages emanate from the distinctly different embodiments among keyer unit 506, keyer unit 406 and keyer unit 306. For example, keyer unit 506 includes one subtracter (546) and one multiplier (522) whereas keyer unit 306 includes one subtracter (330) and two multipliers (322, 346). Inasmuch as keyer unit 506 saves one multiplier over keyer unit 306, the embodiment of keyer unit 506 can be less costly than the embodiment of keyer unit 306. Similarly, keyer unit 506 includes one subtracter (546) and one multiplier (522) whereas keyer unit 406 includes two subtracters (422, 430) and one multiplier (446). Inasmuch as keyer unit 506 saves one subtracter over keyer unit 406, the embodiment of keyer unit 506 can be less costly than the embodiment of keyer unit 406.

The foregoing description of the principles of my invention is by way of illustration only and not by way of limitation. For example, although several illustrative embodiments of a combiner system in accordance with the principles of my invention have been shown and described, other alternative embodiments are possible and would be clear to one skilled in the art upon an understanding of the principles of my invention. Certainly the principles of my invention have utility apart from combining video signals. For example, the combining of any image signal, for example, the combining of a plurality of graphics image signals, could benefit from the application of the principles of my invention. Accordingly, the scope of my invention is to be limited only by the appended claims.

What is claimed is:

1. A method for generating an image information signal combine, the method comprising the steps of
   receiving a plurality of image information signals, each image signal $V_i$ being received from a respective one of a corresponding plurality of channels,
   receiving a plurality of input key signals, each input key signal $Bk_i$ being received from a respective one of the corresponding plurality of channels,
   ranking the channels in a defined order to obtain a prioritized order among the channels,
   responsive to the input key signals, producing a respective processed key signal $Pk_i$ for an i-th channel such that the processed key signal $Pk_i$ is produced by an i-th respective one of a plurality of substantially identical keyer units where the i-th keyer unit is adapted to modify the value of its input key signal $Bk_i$ with the values of input key signals $Bk_j$ from higher priority channels to generate a true transparency processed key signal $Pk_i$ for the i-th priority channel,
   switchably interchanging the plurality of keyer units to obtain the prioritized order among the channels,
   responsive to the respective produced processed key signal, cutting the respective image signal,
   repeating the producing step and the cutting step for the plurality of image signals,
   combining the plurality of cut image signals to generate an image information combine and
   wherein the step of producing a processed key signal further comprises the step of:
   responsive to the input key signals, generating the respective processed key signal $Pk_i$ for the i-th image channel so that:

$$Pk_i = Bk_i \prod_{j=1}^{i} (1 - Bk_{j-1})$$

where $B_0 = 0$ and where $i = 1, 2, \ldots, N$.

2. The method defined in claim 1 wherein the step of producing a processed key signal further comprises the step of:
   responsive to the input signals, generating a processed background key signal $Pk_B$ for a background channel so that:

$$Pk_B = \prod_{j=1}^{N} (1 - Bk_j)$$

3. The method defined in claim 1 further comprising the step of:
   responsive to the input key signals, generating a processed background key signal $Pk_B$ for a background channel so that:

$$Pk_1 + Pk_2 + \ldots + Pk_N + Pk_B = 1.0.$$

4. The method defined in claims 2 or 3 wherein the step of combining the plurality of cut image signals further comprises the step of:
   responsive to the plurality of processing key signals and responsive to the plurality of N image information signals $V_i$ and responsive to a background signal $V_B$, generating an image combine $V_C$ so that:

$$V_C = Pk_1 V_1 + Pk_2 V_2 + \ldots + Pk_N V_N + Pk_B V_B.$$

5. The method defined in claim 1 wherein the step of combining the plurality of cut image signals to generate a combine further comprises the step of:
   responsive to the plurality of N input key signals $Bk_i$ and responsive to the plurality of N image information signals $V_i$ and responsive to a background signal $V_B$, generating an image combine $V_C$ so that:

$$V_C = \sum_{i=1}^{N} V_i Bk_i \prod_{j=1}^{i} (1 - Bk_{j-1}) + V_B \prod_{j=1}^{N} (1 - Bk_j)$$

where $B_0 = 0$.

6. A method for generating an image information signal combine, the method comprising the steps of:
   receiving a plurality of image information signals, each image signal $V_1$ being received from a respective one of a corresponding plurality of channels,
   receiving a plurality of input keys signals, each input key signal $Bk_i$ being received from a respective one of the corresponding plurality of channels,
   ranking the channels in a defined order to obtain a prioritized order among the channels,
   responsive to the input key signals, producing a respective processed key signal $Pk_1$ for an i-th channel such that the processed key signal $Pk_1$ is produced by an i-th respective one of a plurality of substantially identical keyer units where the i-th keyer unit is adopted to modify the value of its input key signal $Bk_i$ with the values of input key signals $Bk_j$ from higher priority channels to generate a true transparency processed key signal $Pk_i$ for the i-th priority channel, switchably interchanging the plurality of keyer units to obtain the prioritized order among the channels.

responsive to the respective produced processed key signal, cutting the respective image signal, repeating the producing step and the cutting step for the plurality of image signals, combining the plurality of cut image signals to generate an image information combine, and wherein the step of producing a processed key signal further comprises the steps of:

multiplying a key-requested signal and a key-available signal to generate a key-taken signal and responsive to the key-taken signal, producing the processed key signal.

7. The method defined in claim 6 wherein the step of producing a processed key signal further comprises the steps of:

multiplying the key-available signal and another key signal, wherein the another key signal is equal to one minus the key-requested signal, to generate a key-now-available signal and extending the key-now-available signal from an i-th channel processed key producing step to an (i+1)-st channel processed key producing step.

8. A method for generating an image information signal combine, the method comprising the steps of:

receiving a plurality of image information signals, each image signal $V_i$ being received from a respective one of a corresponding plurality of channels, receiving a plurality of input key signals, each input key signal $Bk_i$ being received from a respective one of the corresponding plurality of channels, ranking the channels in a defined order to obtain a prioritized order among the channels, responsive to the input key signal, producing a respective processed key signal $Pk_i$ for an i-th channel such that the processed key signal $Pk_i$ is produced by an i-th respective one of a plurality of substantially identical keyer units where the i-th keyer units is adapted to modify the value of its input key signal $Bk_i$ with the values of input key signals $Bk_j$ from higher priority channels to generate a true transparency processed key signal $Pk_i$ for the i-th priority channel, switchably interchanging the plurality of keyer units to obtain the prioritized order among the channels, responsive to the respective produced processed key signal, cutting the respective image signal, repeating the producing step and the cutting step for the plurality of image signals, combining the plurality of cut image signals to generate an image information combine, and wherein the step of producing a processed key signal further comprises the steps of:

multiplying a key-available signal and another key signal, wherein the another key signal is equal to one minus a key-requested signal, to generate a key-now-available signal and extending the key-now-available signal from an i-th channel processed key producing step to an (i+1)-st channel processed key producing step.

9. A system for generating an image information signal combine, the system including:

means for receiving a plurality of image information signals, each image signal $V_i$ being received from a respective one of a corresponding plurality of channels, means for receiving a plurality of input key signals, each input key signal $Bk_i$ being received from a respective one of the corresponding plurality of channels, means for ranking the channels in a defined order to obtain a prioritized order among the channels, means, responsive to a respective input key signal, for producing a respective processed key signal $Pk_i$ for a respective i-th channel, means, responsive to the respective produced processed key signal $Pk_i$, for cutting a respective image signal $V_i$, means for combining a plurality of cut image signals to generate an image information combine, and CHARACTERIZED IN THAT the means for producing a respective processed key signal $Pk_i$ further comprises means for generating the respective processed key signal $Pk_i$ such that the respective processed key signal $Pk_i$ for the respective i-th channel is produced by the i-th respective one of a plurality of substantially identical keyer units where the i-th keyer unit is adapted to modify the value of a respective input key signal $Bk_i$ with the values of input key signals $Bk_j$ from higher priority channels to generate a true transparency processed key signal $Pk_i$ for the i-th priority channel, and CHARACTERIZED IN THAT the system for generating the image information signal combine further comprises:

means for switchably interchanging the plurality of keyer units to obtain the prioritized order among the channels and wherein the means for generating the respective processed key signal further comprises:

means, responsive to the input key signals, for generating the respective processed key signal $Pk_1$ the i-th image signal so that:

$$Pk_i = Bk_i \prod_{j=1}^{i} (1 - Bk_{j-1})$$

where $B_0=0$ and where $i=1,2,3,\ldots,N$.

10. The system defined in claim 9 wherein the means for generating the processed key signal further comprises:

means, responsive to the input key signals, for generating a processed background key signal $Pk_B$ for a background channel so that:

$$Pk_B = \prod_{j=1}^{N} (1 - Bk_j)$$

11. The system defined in claim 9 further comprising:

means, responsive to the input key signals, for generating a processed background key signal $Pk_B$ for a background channel so that:

$$Pk_B = 1 - \sum_{j=1}^{N} Pk_j$$

12. The system defined in claims 10 or 11 wherein the means for combining a plurality of cut image signals further comprises:

means, responsive to the produced processed key signals and responsive to the plurality of N image information signals $V_i$ and responsive to a background signal $V_B$, for generating an image combine $V_C$ so that:

$$V_C = Pk_1 V_1' + Pk_2 V_2 + \ldots + Pk_N V_N + Pk_B V_B.$$

13. The system defined in claim 9 wherein the means for combining a plurality of cut image signals further comprises:

means, responsive to the input key signals $Bk_i$ and responsive to the plurality of N image information signals $V_i$ and responsive to a background signal $V_B$, for generating an image combine $V_C$ so that:

$$V_C = \sum_{i=1}^{N} V_i Bk_i \prod_{j=1}^{i} (1 - Bk_{j-1}) + V_B \prod_{j=1}^{N} (1 - Bk_j)$$

where $B_0 = 0$.

14. A system for generating an image information signal combine, the system including:

means for receiving a plurality of image information signals, each image signal $V_i$ being received from a respective one of a corresponding plurality of channels, means for receiving a plurality of input key signals, each input key signal $Bk_i$ being received from a respective one of the corresponding plurality of channels, means for ranking the channels in a defined order to obtain a prioritized order among the channels, means, responsive to respective input key signal, for producing a respective processed key signal $Pk_i$ for a respective i-th channel, means, responsive to the respective produced processed key signal $Pk_i$, for cutting a respective image signal $V_i$, means for combining a plurality of cut image signals to generate an image information combine, and CHARACTERIZED IN THAT the means for producing a respective processed key signal $Pk_i$ further comprises means for generating the respective processed key signal $Pk_i$ such that the processed key signal $Pk_i$ for the respective i-th channel is produced by the i-th respective one of a plurality of substantially identical keyer units where the i-th keyer unit is adapted to modify the value of a respective input key signal $Bk_i$ with the values of input key signals $Bk_j$ from higher priority channels to generate a true transparency processed key signal $Pk_i$ for the i-th priority channel, and wherein the means for generating a processed key signal further comprises:

means for multiplying a key-requested signal and a key-available signal to generate a key-taken signal and means, responsive to the key-taken signal, for producing the processed key signal and CHARACTERIZED IN THAT the system for generating the image information signal combine further comprises:

means for switchably interchanging the plurality of keyer units to obtain the prioritized order among the channels.

15. The system defined in claim 14 wherein the means for generating a processed key signal further comprises:

means for multiplying the key-available signal and another key signal, wherein the another key signal is equal to one minus the key-requested signal, to generate a key-now-available signal and means for extending the key-now-available signal from an i-th channel to an (i+1)-st channel for use as a key-available signal by the (i+1)-st channel producing a processed key signal means.

16. A system for generating an image information signal combine, the system including:

means for receiving a plurality of image information signals, each image signal $V_i$ being received from a respective one of a corresponding plurality of channels, means for receiving a plurality of input key signals, each input key signal $Bk_i$ being received from a respective one of the corresponding plurality of channels, means for ranking the channels in a defined order to obtain a prioritized order among the channels, means, responsive to a respective input key signal, for producing a respective processed key signal $Pk_i$ for a respective i-th channel, means, responsive to the respective produced processed key signal $Pk_i$, for cutting a respective image signal $V_i$, means for combining a plurality of cut image signals to generate an image information combine, and CHARACTERIZED IN THAT the means for producing a respective processed key signal $Pk_i$ further comprises means for generating the respective processed key signal $Pk_i$ such that the respective processed key signal $Pk_i$ for the respective i-th channel is produced by the i-th respective one of a plurality of substantially identical keyer units where the i-th keyer unit is adapted to modify the value of a respective input key signal $Bk_i$ with the values of input key signals $Bk_j$ from higher priority channels to generate a true transparency processed key signal $Pk_i$ for the i-th priority channel, and wherein the means for generating a processed key signal further comprises:

means for multiplying a key-available signal and another key signal, wherein the another key signal is equal to one minus a key-requested signal, to generate a key-now-available signal and means for extending the key-now-available signal from an i-th channel to an (i+1)-st channel for use as a key-available signal by the (i+1)-st channel producing a processed key signal means and CHARACTERIZED IN THAT the system for generating the image information signal combine further comprises:

means for switchably interchanging the plurality of keyer units to obtain the prioritized order among the channels.

17. Keyer means for generating a processed key signal, the keyer means comprising:

means adapted for receiving an input key signal, the input key signal $Bk_i$ being a respective one of a plurality on input key signals received from a respective one of a corresponding plurality of N channels, each channel for providing a respective one of a corresponding plurality of N image information signals $V_i$;

a plurality of substantially identical keyer units, each keyer unit including means, responsive to the input key signals, for producing a respective processed key signal $Pk_i$ such that the processed key signal for the i-th channel is produced by modifying the value of the input key signal $Bk_i$ in the i-th channel with the values of the input key signals $Bk_j$ from the higher priority channels to generate a true transparency processed key signal $Pk_i$ for the i-th priority channel; and means for prioritizing the plurality of channels, the prioritizing means including means for switchably interchanging the priority of one keyer unit with the priority of another keyer unit and wherein the keyer unit means for producing a respective processed key signal further comprises:

means, responsive to the input key signals, for generating the respective processed key signal $Pk_i$ for the i-th image signal so that:

$$Pk_i = Bk_i \prod_{j=1}^{i} (1 - Bk_{j-1})$$

where $B_0 = 0$ and where $i = 1, 2, 3, \ldots, N$.

18. The keyer means defined in claim 17 wherein the keyer unit means for producing a respective processed key signal further comprises:

means, respective to the input key signals, for generating a processed background key signal $Pk_B$ for a background channel so that:

$$Pk_B = \prod_{j=1}^{N} (1 - Bk_j)$$

19. The keyer means defined in claim 17 further comprising:

means, responsive to the input key signals, for generating a processed background key signal $Pk_B$ for a background channel so that:

$$Pk_1 + Pk_2 + \ldots + Pk_N + Pk_B = 1.0.$$

20. Keyer means for generating a processed key signal, the keyer means comprising:

means adapted for receiving an input key signal, the input key signal $Bk_i$ being a respective one of a plurality on input key signals received from a respective one of a corresponding plurality of N channels, each channel for providing a respective one of a corresponding plurality of N image information signals $V_i$;

a plurality of substantially identical keyer units, each keyer unit including means, responsive to the input key signals, for producing a respective processed key signal $Pk_i$ such that the processed key signal for the i-th channel is produced by modifying the value of the input key signal $Bk_i$ in the i-th channel with the values of the input key signals $Bk_j$ from the higher priority channels to generate a true transparency processed key signal $Pk_i$ for the i-th priority channel; and means for prioritizing the plurality of channels, the prioritizing means including means for switchably interchanging the priority of one keyer unit with the priority of another keyer unit and wherein the means for producing a processed key signal further comprises:

means for multiplying a key-requested signal and a key-available signal to generate a key-taken signal and means, responsive to the key-taken, for producing the processed key signal.

21. The keyer means defined in claim 20 wherein the means for producing a processed key signal further comprises:

means for multiplying the key-available signal and another key signal, wherein the another key signal is equal to one minus the key-requested signal, to generate a key-now-available signal and means for providing the key-now-available signal from an i-th channel for use by an (i+1)-st channel as a key-available signal by the (i+1)-st channel producing a processed key signal means.

22. Keyer means for generating a processed key signal, the keyer means comprising:

means adapted for receiving an input key signal, the input key signal $Bk_i$ being a respective one of a plurality on input key signals received from a respective one of a corresponding plurality of N channels, each channels for providing a respective one of a corresponding plurality of N image information signals $V_i$;

a plurality of substantially identical keyer units, each keyer unit including means, responsive to the input key signals, for producing a respective processed key signal $Pk_i$ such that the processed key signal for the i-the channel is produced by modifying the value of the input key signal $Bk_j$ in the i-th channel with the values of the input key signals $Bk_j$ from the higher priority channels to generate a true transparency processed key signal $Pk_i$ for the i-th priority channel; and means for prioritizing the plurality of channels, the prioritizing means including means for switchably interchanging the priority of one keyer unit with the priority of another keyer unit and wherein the means for producing a processed key signal further comprises:

means for multiplying a key-available signal and another key signal, wherein the another key signal is equal to one minus a key-requested signal, generate a key-now-available signal and means for providing the key-now-available signal from an i-th channel for use by an (i+1)-st channel as a key-available signal by the (i+1)-st channel producing a processed key signal means.

23. A method for generating a processed key signal, the method comprising the steps of:

receiving a plurality of input key signals, each input key signal $Bk_i$ being received from a respective one of a corresponding plurality of N priority channels, each channel for providing a respective one of a corresponding plurality of image information signals $V_i$, switchably interchanging a plurality of a substantially identical keyer units to obtain a prioritized order among the channels, responsive to the input key signals, producing a respective processed key signal $Pk_i$ for an i-th channel such that the processed key signal $Pk_i$ is produced by the i-th respective one of the plurality of keyer units where the i-th keyer unit is adapted to modify the value of its input key signal $Bk_j$ with the values of the input key signals $Bk_j$ from higher priority channels to generate a true transparency processed key signal $Pk_i$ for the i-th priority channel and the step of producing a respective processed key signal further comprises the step of:

responsive to the input key signals, generating a respective processed key signal $Pk_i$ for the i-th image signal so that:

$$Pk_i = Bk_i \prod_{j=1}^{i} (1 - Bk_{j-1})$$

where $B_0 = 0$ and where $i = 1, 2, 3, \ldots, N$.

24. The method defined in claim 23 wherein the step of producing a respective processed key signal further comprises the step of:

responsive to the input key signals, generating a processed background key signal $Pk_B$ for a background channel so that:

$$Pk_B = \prod_{j=1}^{N} (1 - Bk_j)$$

25. The method defined in claim 23 further comprising the step of:

responsive to the input key signals, generating a processed background key signal $Pk_B$ for a background channel so that:

$$Pk_1 + Pk_2 + \ldots + Pk_N + Pk_B = 1.0.$$

26. A method for generating a processed key signal, the method comprising the steps of:

receiving a plurality of input key signals, each input key signal $Bk_i$ being received from a respective one of a corresponding plurality of N prioritized channels, each channel for providing a respective one of a corresponding plurality of image information signals $V_i$, switchably interchanging a plurality of a substantially identical keyer units to obtain a prioritized order among the channels, responsive to the input key signals, producing a respective processed key signal $Pk_i$ for an i-th channel such that the processed key signal $Pk_i$ is produced by the i-th respective one of the plurality of keyer units where the i-th keyer unit is adapted to modify the value of its input key signal $Bk_i$ with the values of the input key signals $Bk_j$ from higher priority channels to generate a true transparency processed key signal $Pk_i$ for the i-th priority channel and wherein the step of producing a processed key signal further comprises the steps of:

multiplying a key-requested signal and a key-available signal to generate a key-taken signal and responsive to the key-taken signal, producing the processed key signal.

27. The method defined in claim 26 wherein the step of producing a processed key signal further comprises the steps of:

multiplying the key-available signal and another key signal, wherein the another key signal is equal to one minus the key-requested signal, to generate a key-now-available signal and providing the key-now-available signal for coupling from an i-th channel to an (i+1)-st channel for use as a key-available signal by the (i+1)-st channel producing a processed key signal means.

28. A method for generating a processed key signal, the method comprising the steps of:

receiving a plurality of input key signals, each input key signal $Bk_i$ being received from a respective one of a corresponding plurality of N prioritized channels, each channel for providing a respective one of a corresponding plurality of image information signals $V_i$, switchably interchanging a plurality of a substantially identical keyer units to obtain a prioritized order among the channels, responsive to the input key signals, producing a respective processed key signal $Pk_i$ for an i-th channel such that the processed key signal $Pk_i$ is produced by the i-th respective one of the plurality of keyer units where the i-th keyer unit is adapted to modify the value of its input key signal $Bk_i$ with the values of the input key signals $Bk_j$ from higher priority channels to generate a true transparency processed key signal $Pk_i$ for the i-th priority channel and wherein the step of producing a processed key signal further comprises the steps of:

multiplying a key-available signal and another key signal, wherein the another key signal is equal to one minus a key-requested signal, to generate a key-now-available signal and providing the key-now-available signal for coupling from an i-th channel to an (i+1)-st channel for use as a key-available signal by the (i+1)-st channel producing a processed key signal means.

29. A method for generating a true transparency special video effect, the method comprising the steps of:

receiving a plurality of video signals and a corresponding plurality of input key signals;

rank ordering the video signals for a special effect combine;

switchably interchanging a plurality of keyer units to obtain the rank order among the video signals, responsive to the input key signals, producing a respective processed key signal $Pk_i$ for a respective video signal such that the produced processed key signal for the i-th channel is produced by a respective one of the keyer units by modifying the value of the input key signal $Bk_i$ in the i-th channel with the values of the input key signals $Bk_j$ from higher priority channels to generate a true transparency processed key signal $Pk_i$ for the i-th priority channel;

combining the video signals and their respective produced processed key signals to generate the true-transparency special effect and wherein the producing a processed key signal step further comprises the step of:

responsive to the input key signals, generating the respective produced key signal $Pk_i$ for the i-th video signal so that:

$$Pk_i = Bk_i \prod_{j=1}^{i} (1 - Bk_{j-1})$$

where $B_0 = 0$ and where $i = 1, 2, 3, \ldots, N$.

30. The method defined in claim 29 wherein the producing a respective processed key signal step further comprises the step of:

responsive to the input key signals, generating a background key signal $Pk_B$ for a background channel so that:

$$Pk_B = \prod_{j=1}^{N} (1 - Bk_j)$$

31. The method defined in claim 29 further comprising the step of:

responsive to the input key signals, generating a background key signal $Pk_B$ for a background channel so that:

$$Pk_1 + Pk_2 + \ldots + Pk_N + Pk_B = 1.0$$

32. The method defined in claims 30 or 31 wherein the step of combining to generate a true transparency special effect further comprises the step of:

responsive to the produced processed key signals and responsive to the plurality of video signals $V_i$ and responsive to a background signal $V_B$, generating a special effect $V_C$ so that:

$$V_C = Pk_1 V_1 + Pk_2 V_2 + \ldots + Pk_N V_N + Pk_B V_B.$$

33. The method defined in claim 29 wherein the combining the plurality of video signals to generate the special effect step further comprises the step of:

responsive to the plurality of N input key signals $Bk_i$ and responsive to the plurality of N video signals $V_i$ and responsive to a background signal $V_B$, generating a special effect $V_C$ so that:

$$V_C = \sum_{i=1}^{N} V_i Bk_i \prod_{j=1}^{i} (1 - Bk_{j-1}) + V_B \prod_{j=1}^{N} (1 - Bk_j)$$

where $B_0 = 0$.

34. A method for generating a true transparency special video effect, the method comprising the steps of:

receiving a plurality of video signals and a corresponding plurality of input key signals;

rank ordering the video signals for a special effect combine;

switchably interchanging a plurality of keyer units to obtain the rank order among the video signals, responsive to the input key signals, producing a respective processed key signal $Pk_i$ for a respective video signal such that the produced processed key signal for the i-th channel is produced by a respective one of the keyer units by modifying the value of the input key signal $Bk_i$ in the i-th channel with the values of the input key signals $Bk_j$ from higher priority channels to generate a true transparency processed key signal $Pk_i$ for the i-th priority channel;

combining the video signals and their respective produced processed key signals to generate the true-transparency special effect and wherein the producing a processed key signal step further comprises the steps of:

multiplying a key-requested signal and a key-available signal to generate a key-taken signal and responsive to the key-taken signal, producing the processed key signal.

35. The method defined in claim 34 wherein the producing a processed key signal step further comprises the steps of:

multiplying the key-available signal and another key signal, wherein the another key is equal to one minus the key-requested signal, to generate a key-now-available signal and extending the key-now-available signal from an i-th channel processed key producing step to an (i+1)-st channel processed key producing step.

36. A method for generating a true transparency special video effect, the method comprising the steps of:

receiving a plurality of video signals and a corresponding plurality of input key signals;

rank ordering the video signals for a special effect combine;

switchably interchanging a plurality of keyer units to obtain the rank order among the video signals, responsive to the input key signals, producing a respective processed key signal $Pk_i$ for a respective video signal such that the produced processed key signal for the i-th channel is produced by a respective one of the keyer units by modifying the value of the input key signal $Bk_i$ in the i-th channel with the values of the input key signals $Bk_j$ from higher priority channels to generate a true transparency processed key signal $Pk_i$ for the i-th priority channel;

combining the video signals and their respective produced processed key signals to generate the true-transparency special effect and wherein the producing a processed key signal step further comprises the steps of:

multiplying a key-available signal and another key signal, wherein the another key signal is equal to one minus a key-requested signal, to generate a key-now-available signal and extending the key-now-available signal from an i-th channel processed key producing step to an (i+1)-st channel processed key producing step.

* * * * *